(12) United States Patent
Regau

(10) Patent No.: US 10,231,311 B2
(45) Date of Patent: Mar. 12, 2019

(54) METHOD FOR OPERATING AN OPTOELECTRONIC ASSEMBLY AND OPTOELECTRONIC ASSEMBLY

(71) Applicant: OSRAM OLED GmbH, Regensburg (DE)

(72) Inventor: Kilian Regau, Regensburg (DE)

(73) Assignee: OSRAM OLED GMBH, Regensburg (DE)

( * ) Notice: Subject to any disclaimer, the term of this patent is extended or adjusted under 35 U.S.C. 154(b) by 80 days.

(21) Appl. No.: 15/329,273

(22) PCT Filed: Aug. 25, 2015

(86) PCT No.: PCT/EP2015/069459
§ 371 (c)(1),
(2) Date: Jan. 26, 2017

(87) PCT Pub. No.: WO2016/030382
PCT Pub. Date: Mar. 3, 2016

(65) Prior Publication Data
US 2018/0213617 A1    Jul. 26, 2018

(30) Foreign Application Priority Data
Aug. 26, 2014   (DE) ......................... 10 2014 112 175

(51) Int. Cl.
*H05B 33/08*        (2006.01)
(52) U.S. Cl.
CPC ......... *H05B 33/089* (2013.01); *H05B 33/083* (2013.01); *H05B 33/0824* (2013.01); *H05B 33/0845* (2013.01)
(58) Field of Classification Search
None
See application file for complete search history.

(56) References Cited

U.S. PATENT DOCUMENTS

2003/0117088 A1*  6/2003  Tanabe ............... H05B 33/0815
                                                                            315/291
2005/0237211 A1   10/2005 Sato et al.
(Continued)

FOREIGN PATENT DOCUMENTS

CN        102180124 A      9/2011
DE     102010003506 A1    10/2010
(Continued)

OTHER PUBLICATIONS

Chinese Office Action based on application No. 201580038209.X (4 pages and 7 pages of English translation) dated Nov. 16, 2017 (Reference Purpose Only).
(Continued)

*Primary Examiner* — Jimmy T Vu
*Assistant Examiner* — Laura Yesildag
(74) *Attorney, Agent, or Firm* — Viering Jentschura & Partner MBB

(57) ABSTRACT

A method for operating an optoelectronic assembly which includes at least one component string having at least one section, wherein the section includes at least one light emitting diode element, is provided. According to the method, the section is supplied with electrical energy, the supply of the section with electrical energy is interrupted, an input of the section is electrically coupled to an output of the section, wherein the section is short-circuited via the electrical coupling of the input to the output, a maximum value of an electrical discharge current which flows via the section is detected, and the fact of whether the section of the component string has a short circuit is determined depending on the detected maximum value.

16 Claims, 10 Drawing Sheets

(56) References Cited

U.S. PATENT DOCUMENTS

| | | | |
|---|---|---|---|
| 2006/0170287 A1 | 8/2006 | Ito et al. | |
| 2007/0159750 A1* | 7/2007 | Peker | H05B 33/0869 361/93.1 |
| 2009/0009088 A1* | 1/2009 | Ito | H05B 33/0815 315/77 |
| 2011/0169496 A1* | 7/2011 | Fried | B60Q 11/005 324/503 |
| 2011/0204792 A1* | 8/2011 | Siegmund | H05B 33/0896 315/119 |
| 2012/0098430 A1 | 4/2012 | Inoue et al. | |
| 2012/0161634 A1* | 6/2012 | Kuo | H05B 33/0827 315/119 |
| 2012/0206146 A1* | 8/2012 | Avenel | H05B 33/089 324/414 |
| 2013/0049599 A1 | 2/2013 | Logiudice | |
| 2013/0119861 A1 | 5/2013 | Vollmer | |
| 2014/0132273 A1* | 5/2014 | Iwakiri | H05B 33/0815 324/414 |
| 2014/0139227 A1* | 5/2014 | Iwakiri | H05B 33/0815 324/414 |
| 2015/0319814 A1* | 11/2015 | Grotsch | H01L 27/15 315/186 |
| 2017/0231058 A1* | 8/2017 | Sadwick | H05B 33/0896 |
| 2017/0307695 A1* | 10/2017 | Wang | G01R 31/2635 |

FOREIGN PATENT DOCUMENTS

| | | |
|---|---|---|
| DE | 102009055048 A1 | 6/2011 |
| DE | 102012107882 A1 | 2/2013 |
| JP | H02287492 A | 11/1990 |
| JP | 2006210219 A | 8/2006 |
| JP | 2012099337 A | 5/2012 |
| JP | 2013186946 A | 9/2013 |
| JP | 2013536571 A | 9/2013 |
| KR | 20030035203 A | 5/2003 |
| KR | 1020080106234 A | 12/2008 |
| KR | 1357635 B1 | 2/2014 |
| KR | 1020140070289 A | 6/2014 |
| WO | 2007096868 A1 | 8/2007 |
| WO | 2010046811 A1 | 4/2010 |
| WO | 2010060458 A1 | 6/2010 |
| WO | 2011050421 A1 | 5/2011 |
| WO | 2011073096 A1 | 6/2011 |
| WO | 2012004720 A2 | 1/2012 |

OTHER PUBLICATIONS

Notice of Allowance received for the corresponding U.S. Appl. No. 15/328,914 (8 pages) dated Sep. 11, 2017 (for reference purpose only).
German Office Action based on application No. 10 2014 112 175.9 (5 pages) dated May 26, 2017 (Reference Purpose Only).
German Office Action based on application No. 10 2014 112 176.7 (6 pages) dated May 26, 2017 (Reference Purpose Only).
German Search Report based on application No. 10 2014 112 176.7 (7 pages) dated May 4, 2015 (for reference purpose only).
International Search Report based on application No. PCT/EP2015/066415 (3 pages) dated Nov. 18, 2015 and English Translation (2 pages) (Reference Purpose Only).
Korean Office Action based on application No. 10-2016-7035536 (5 pages and 6 pages of English tarnslation) dated Sep. 28, 2017 (Reference Purpose Only).
German Search Report based on application No. 10 2014 112 175.9 (7 pages) dated May 4, 2015 (for reference purpose only).
International Search Report based on application No. PCT/EP2015/069459 (4 pages) dated Feb. 22, 2016 and English Translation (3 pages) (Reference Purpose Only).
Korean Office Action based on application No. 10-2017-7003000 (6 pages and 7 pages of English tarnslation) dated Jun. 1, 2018 (Reference Purpose Only).

\* cited by examiner

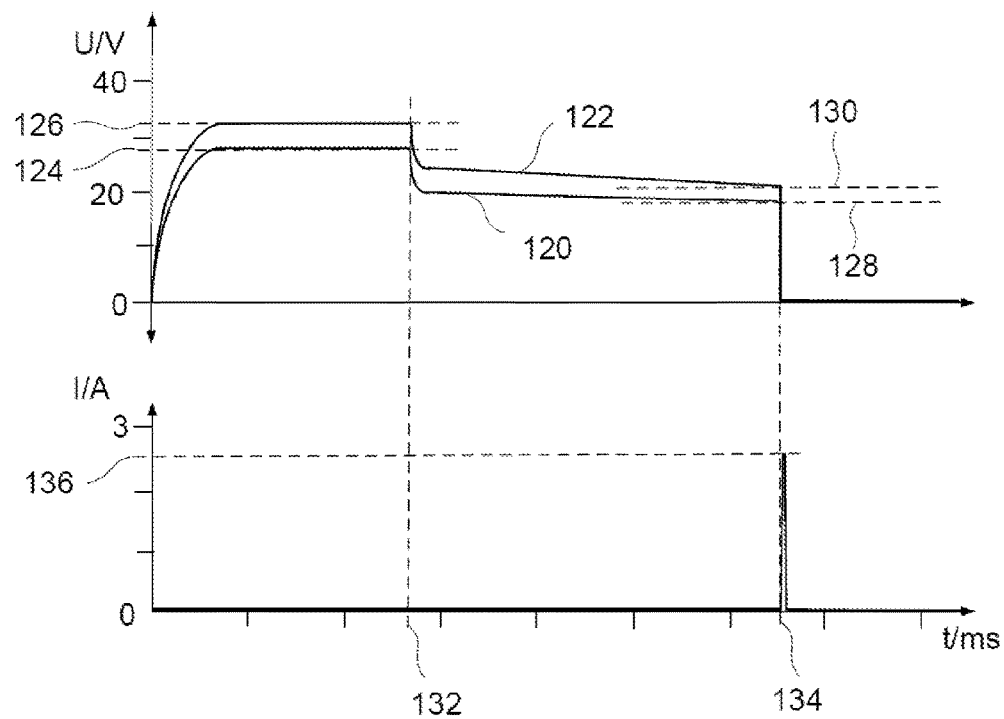

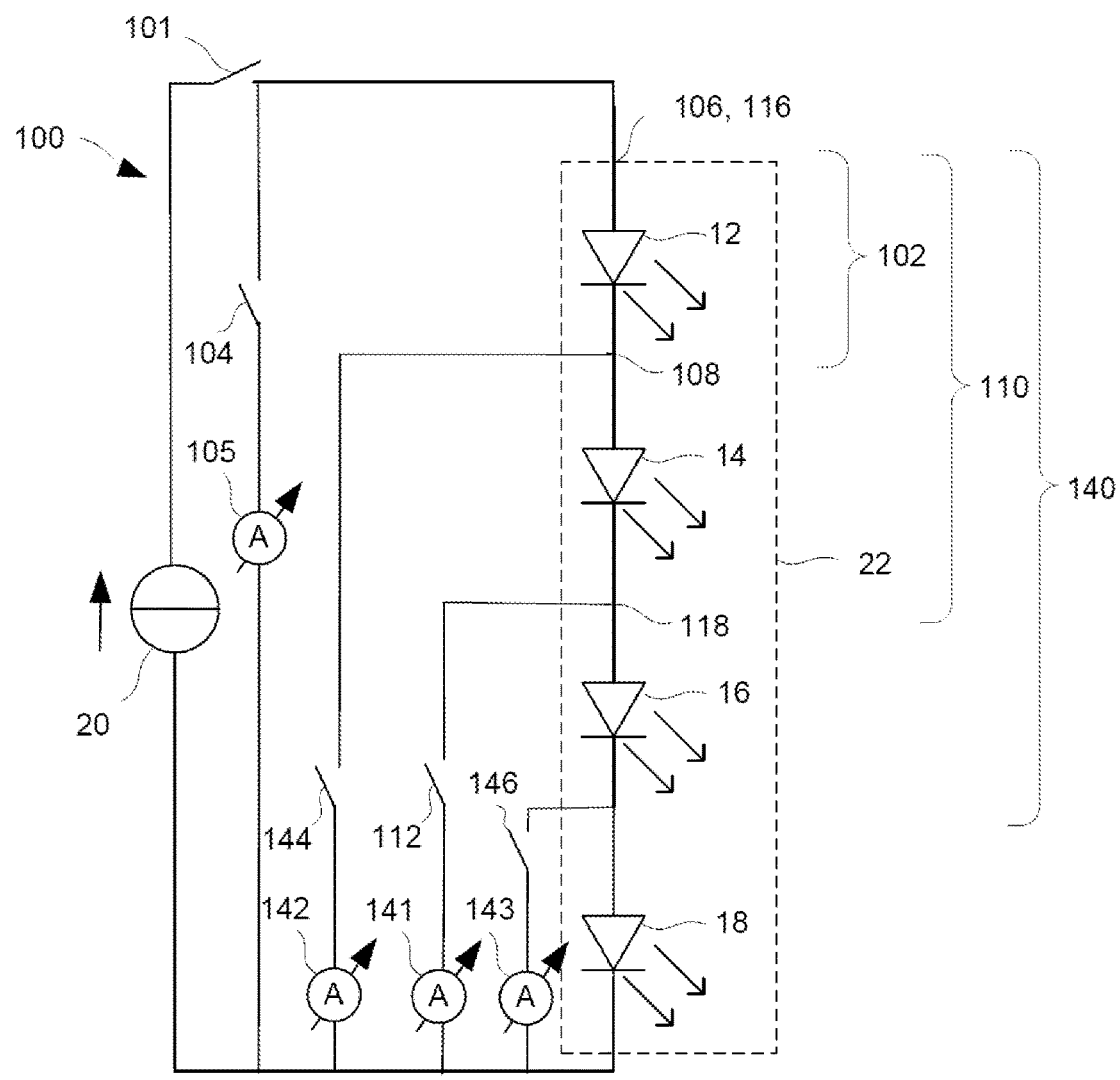

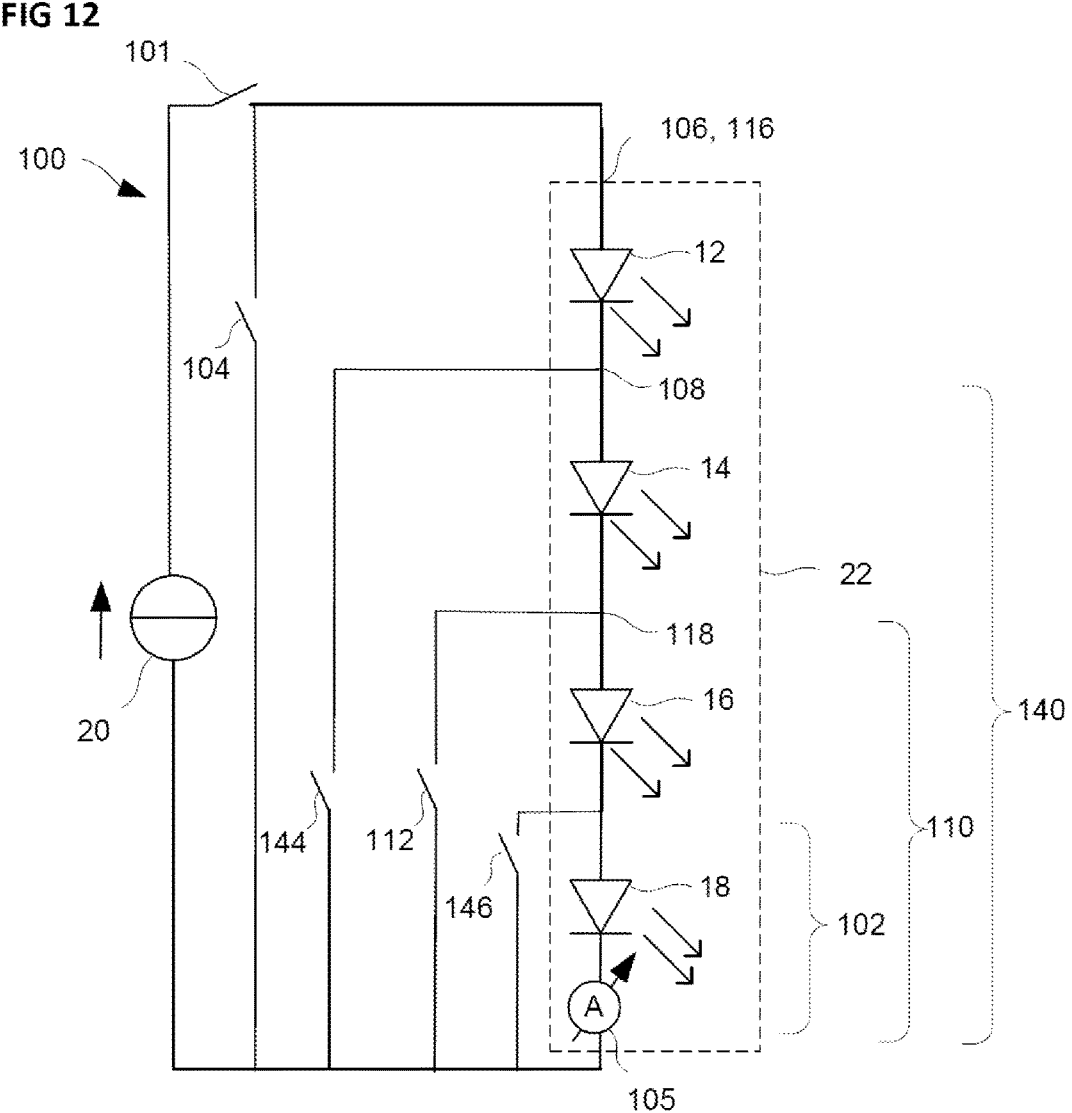

METHOD FOR OPERATING AN OPTOELECTRONIC ASSEMBLY AND OPTOELECTRONIC ASSEMBLY

RELATED APPLICATIONS

The present application is a national stage entry according to 35 U.S.C. § 371 of PCT application No.: PCT/EP2015/069459 filed on Aug. 25, 2015, which claims priority from German application No.: 10 2014 112 175.9 filed on Aug. 26, 2014, and is incorporated herein by reference in its entirety.

TECHNICAL FIELD

Various embodiments relate to a method for operating an optoelectronic assembly and to an optoelectronic assembly.

BACKGROUND

An optoelectronic assembly may include for example one, two or more light emitting diode elements. The light emitting diode elements can be for example light emitting diodes (LEDs) and/or organic light emitting diodes (OLEDs) or parts or segments of light emitting diodes (LEDs) and/or organic light emitting diodes (OLEDs).

Despite elaborate quality control procedures for light emitting diode elements, the situation in which the light emitting diode elements fail spontaneously in use cannot be completely ruled out. In the case of an OLED, for example, a typical fault pattern for a spontaneous failure is a short circuit (referred to as: short) between the electrodes of the corresponding light emitting diode element. Such a short circuit is generally over a small area. A large part of the total current is thus concentrated at the short-circuit point having a small area. Consequently, the current density is significantly boosted at the short-circuit point, as a result of which said short-circuit point can heat up greatly depending on its areal extent. This can lead to the melting of the electrodes, to dark spots in the luminous image of the OLED, to a completely dark OLED and/or to a location becoming hot on the OLED.

In order to prevent a potential hazard as a result of this overheating (combustion hazard, fire, rupture, etc.), such a short circuit should be identified by driver electronics of the optoelectronic assembly and a suitable protective reaction should be initiated (switching off of the OLED or of the optoelectronic assembly, bypassing of the supply current around the short-circuited OLED, outputting of a warning signal, etc.). In the automotive sector, for example, it is demanded that defective OLEDs or LEDs, for example in rear lights, be electronically identified and at least reported to the on-board system.

A customary interconnection of light emitting diode elements, for example OLEDs, of an optoelectronic assembly in use is, for technical reasons and for cost reasons, the series connection of the light emitting diode elements. By way of example, a plurality of light emitting diode elements in a light emitting diode can be connected in series and/or a plurality of light emitting diodes can be connected in series. In many applications, for example in the automotive sector or in the field of general lighting, a plurality of light emitting diode elements are thus electrically connected in series. If individual defective light emitting diode elements in a series connection are intended to be identified using simple methods, this constitutes a particular challenge.

US 2011 204 792 A1, WO 2010 060 458 A1 and WO 2012 004 720 A2 disclose methods for determining short circuits of individual OLEDs in which an overvoltage or undervoltage at the corresponding OLED is used as a criterion for a defect. As a reaction to the identification of the short circuit, the methods implement bypassing of the drive current and/or fault signal generation.

In the field of general lighting it is typically the case that flexible control devices have a variable output range. As a result, a variable number of light emitting diode elements can be connected to the control devices. The number actually connected is not known during the programming and/or development of the control devices. By way of example, between two and seven OLEDs can be connected to a typical driver circuit from the field of general lighting. The number is variable within the predefined scope, that is to say that fixed undervoltage identification thresholds cannot be defined in the case of the driver circuit. One input possibility at the driver circuit for inputting the number of connected light emitting diode elements is complex and expensive.

FIG. 1 shows a conventional optoelectronic assembly 10 including a first light emitting diode element 12, a second light emitting diode element 14, a third light emitting diode element 16 and a fourth light emitting diode element 18. The light emitting diode elements 12, 14, 16, 18 are arranged in a component string 22 of the optoelectronic assembly 10. The second light emitting diode element 14 has a short circuit, which is depicted as short-circuit resistance 24 in FIG. 1. The short-circuit resistance 24 is electrically connected in parallel with the second light emitting diode element 14 and behaves electrically similarly to an ohmic resistance, wherein the value of the resistance can vary depending on the type of short circuit.

With a measurement of the forward voltage in accordance with the conventional methods for determining the short circuit in the case of the optoelectronic assemblies 10 illustrated in FIGS. 1 and 2, the following problems arise if individual measurement is not carried out at each light emitting diode element 12, 14, 16, 18: The resistance value (R_Short) of the short-circuit resistance 24, for example in the case of an OLED, is in a wide range, for example of between 10 ohms and a number of kohms. With one input of the component string 22 and one output of the component string 22, only a total voltage (Utot) across all the light emitting diode elements 12, 14, 16, 18 can be detected during nominal operation. Given identical light emitting diode elements 12, 14, 16, 18, the total voltage thus corresponds to four times corresponding individual voltages (Uf) of the light emitting diode elements 12, 14, 16, 18 and, without a short circuit, results as $Utot=4\times Uf.$ If the short circuit is present in the case of one of the light emitting diode elements 12, 14, 16, 18, then the following results:

$Utot=3\times Uf+R\_Short\times I.$

Given an individual voltage of Uf=6V, a nominal operating current (I) of 300 mA and a short circuit having a resistance value of 10 ohms, the total voltage results as $Utot=3\times 6\ V+10\ ohms\times 0.3\ A=21\ V.$ If the identification threshold (U_T) for the short circuit in the case of one of the light emitting diode elements 12, 14, 16, 18 is set to three and half times the individual voltage, then the identification threshold results as $U\_T=3.5\times 6\ V=21\ V.$ Consequently, the total voltage in this example is exactly at the identification threshold, which does not yield sufficient identification certainty in the case of variations of the corresponding measurement values that occur in reality.

If the short circuit only has a resistance value of 50 ohms, for example, then the total voltage results as $$U_{tot}=3\times 6\text{ V}+4.8\text{ V}=22.8\text{ V},$$

for which reason the short circuit with the above identification threshold U_T=21 V is not identified as such. This can stem from the fact that a corresponding short circuit can have a higher resistance than the organic system of the short-circuited OLED. The individual voltage of the corresponding OLED is thus principally determined by the organic system and not by the short circuit. Nevertheless, the current density is increased at the short-circuit point, which leads to the temperature increase, for which reason there should be a reaction to the short circuit.

In the case of flexible control devices for connecting different numbers of light emitting diode elements 12, 14, 16, 18, the conventionally identifiable reduction of the total voltage by a short circuit goes down as a percentage, in particular in the case of long string lengths, or is partly canceled out by the voltage drop at the short circuit and is thus tolerance-susceptible. A short-circuit signature present in the case of the total voltage is identifiable with difficulty or not at all, since, in the case of undefined string lengths, a dedicated fault threshold would have to be defined for each string length.

The problems thus arise that, in the case of a short circuit, the individual voltage across the short-circuited light emitting diode element 12, 14, 16, 18, owing to the voltage drop at the short circuit during nominal operation, does not necessarily drop significantly compared with a light emitting diode element 12, 14, 16, 18 without a short circuit, and that, in the case of an unknown number of light emitting diode elements 12, 14, 16, 18, in principle it cannot be identified whether the total voltage is normal or lower than normal owing to a short circuit.

Therefore, it is known to provide just one light emitting diode element per driver circuit, that is to say no series connection, or dedicated detection electronics are fitted at each light emitting diode element or, at each OLEDs connection point, voltage measuring lines have to be led to the driver control electronics, which means an increased wiring outlay. These approaches are expensive and complex.

In order to measure the individual forward voltages, therefore, either a measuring system has to be connected to each OLED, which requires a high wiring outlay and a high number of measuring systems and thus causes high costs, or a single measuring system has to be switched through to the individual OLEDs in each case, for example by means of multiplexing, which however likewise requires a high wiring outlay and outlay for multiplexing and thus causes high costs.

Systems are known, however, in which, in a manner governed by the design, each light emitting diode element is individually contacted with a transistor for switching the light emitting diode element and corresponding control lines to the transistors are present, for example for a dimming and/or a flashing system.

FIG. 2 shows a conventional optoelectronic assembly 10 that largely corresponds to the conventional assembly 10 explained above. The optoelectronic assembly 10 can be for example from the automotive sector, for example a direction indicator of a motor vehicle, for example an animated flashing indicator. The light emitting diode elements 12, 14, 16, 18 are intended to be driven individually with constant current. For cost reasons, the light emitting diode elements 12, 14, 16, 18 are electrically connected in series and only one driver circuit 20 is used, for example a rapidly regulating current source, for example a DC-DC converter. Each light emitting diode element 12, 14, 16, 18 is electrically connected in parallel with respectively a switch, for example a first transistor 32, a second transistor 34, a third transistor 36 and a fourth transistor 36. The current can thus be conducted individually past each light emitting diode element 12, 14, 16, 18 and nevertheless through the other light emitting diode elements 12, 14, 16, 18. For the purpose of dimming, the transistors 32, 34, 36, 38 can also be driven in a pulse-width-modulated manner.

In the case of the conventional optoelectronic assembly shown in FIG. 2, the individual forward voltage can be measured relatively simply compared with FIG. 1. A measuring system can be connected which detects the total voltage, and apart from one switch all the other switches can be closed successively, such that all the light emitting diode elements apart from one are bridged, and then the forward voltage of the individual light emitting diode element can be detected by means of the measuring system. However, here, too, the corresponding light emitting diode element is measured during operation and, as explained above, a drop in the forward voltage is not reliably identifiable depending on the short-circuit resistance.

In many applications, however, in order to reduce costs and wiring outlay, a plurality of OLEDs are connected in series, as shown in FIGS. 1 and 2, and operated with current regulation by a single driver channel. In such applications, the known methods for identifying short circuits are not suitable, do not function sufficiently well or are usable only with increased technical outlay and/or outlay in terms of costs. Consequently, the conventional methods cannot reliably identify one or more short-circuited light emitting diode elements within a series connection or can reliably identify said element(s) only with high technical outlay.

SUMMARY

One object of the present disclosure is to provide a method for operating an optoelectronic assembly which makes it possible: to reliably identify a short circuit of an individual light emitting diode element of the optoelectronic assembly, to reliably identify a short circuit of a light emitting diode element in a series connection of light emitting diode elements of the optoelectronic assembly, to identify the short circuit with only one input and one output of a driver circuit of the optoelectronic assembly, to minimize an interference variable influence of aging and/or temperature on the identification of the short circuit and/or to reliably identify the short circuit without knowledge of the number of light emitting diode elements connected in series and/or operated with a driver circuit.

Another object of the present disclosure is to provide an optoelectronic assembly which makes it possible: to reliably identify a short circuit of an individual light emitting diode element of the optoelectronic assembly, to reliably identify a short circuit of a light emitting diode element in a series connection of light emitting diode elements of the optoelectronic assembly, to identify the short circuit with only one input and one output of a driver circuit of the optoelectronic assembly, to minimize an interference variable influence of aging and/or temperature on the identification of the short circuit and/or to reliably identify the short circuit without knowledge of the number of light emitting diode elements connected in series and/or operated with a driver circuit.

The objects are achieved by the features of the independent claims.

The objects are achieved in accordance with one aspect of various embodiments by means of a method for operating an optoelectronic assembly. The optoelectronic assembly includes at least one component string having at least one section. The section includes at least one light emitting diode element. The section is supplied with electrical energy. The supply of the section with energy is interrupted. An input of the section is electrically coupled to an output of the section. A maximum value of an electrical discharge current which flows via the section is detected. The fact of whether the section of the component string has a short circuit is determined depending on the detected maximum value.

The electrical coupling of the input and the output of the section of the component string, said section still being operated shortly beforehand, and the measuring of the maximum value occurring here for the discharge current which flows via the electrical coupling make it possible to reliably identify even an individual short-circuited light emitting diode element, in particular in an electrical series connection, in the section. A string length of the component string and/or of the section or of further sections of the component string, in particular the number of light emitting diode elements electrically connected in series, need not be known for identifying the short circuit, since the maximum value of the discharge current is independent of the number of light emitting diode elements. A driver circuit for operating, in particular for driving, for controlling and/or for regulating, the light emitting diode elements of the component string can be used for identifying the short circuit, in which case said driver circuit only has to have one input and one output. Depending on the embodiment, the influence of interference variables such as aging and temperature on the detection can be minimized/eliminated, as explained in greater detail further below. The light emitting diode element is for example an OLED or an LED or a part or a segment of an OLED or LED.

The maximum value of the discharge current is measurable via the input and the output of the section. In the case of a section without a short circuit, the maximum value differs significantly from a section with a short circuit. The maximum value is independent or at least approximately independent of the resistance value of the short circuit. The maximum value is independent or at least approximately independent of the string length of the component string and, in particular, of the section, wherein the string length relates to the number of light emitting diode elements in the component string or the section. The maximum value is thus independent or at least approximately independent of the number of light emitting diode elements in the component string and, in particular, in the section. The fact that the short circuit is present in the section and/or the component string means that one of the light emitting diode elements in the corresponding section and/or component string has the short circuit. The fact that the maximum value is approximately independent of the resistance value of the short circuit, the string length of the component string and, in particular, of the section and/or approximately independent of the number of light emitting diode elements in the component string and, in particular, in the section means, for example, that the maximum value is correspondingly independent within acceptable tolerances that occur in reality and it is thus reliably possible to identify the short circuit on the basis of the maximum value.

When supplying the section with electrical energy, depending on corresponding switches, the corresponding section can be supplied with electrical energy in isolation or in association with other sections. In particular, in order to supply the section with electrical energy, the entire component string can be supplied with electrical energy. Accordingly, when interrupting the supply of the section with electrical energy, only the supply of the section or the supply of the section in association with other sections can be interrupted. In particular, the supply of the section with electrical energy can be interrupted by interrupting the supply of the component string with energy.

As a reaction to the identification of the short circuit, for example, the driver circuit can switch off or be switched off, a warning signal can be generated and conducted to a superordinate unit, for example a computing unit, for example an on-board computer of a motor vehicle, and/or the short-circuited light emitting diode element can be electrically bypassed. This may be of interest for example in the automotive sector and/or in the field of general lighting, in particular in the case of a flexible driver circuit to which different numbers of light emitting diode elements can be connected, and/or in the consumer sector, for example in the case of a handheld luminaire having an individual OLED or a plurality of OLEDs.

In accordance with one development, it is identified that the section has the short circuit if the detected maximum value is equal or at least approximately equal to zero, and it is identified that the section has no short circuit if the detected maximum value is not equal to zero. This contributes to identifying the short circuit in a simple manner if the section, the component string and/or the optoelectronic assembly include(s) only one light emitting diode element.

In accordance with one development, the detected first maximum value is compared with a predefined setpoint value that is greater than zero. It is identified that the section of the component string has the short circuit if the detected maximum value is less than the predefined setpoint value. It is identified that the section of the component string has no short circuit if the detected maximum value is equal or at least approximately equal to or greater than the predefined setpoint value. This contributes to identifying the short circuit in a simple manner if the section, the component string and/or the optoelectronic assembly include(s) two, three or more light emitting diode elements. The predefined setpoint value can correspond for example to a quotient of a threshold voltage and an electrode resistance of one of the light emitting diode elements. The electrode resistance is the ohmic resistance of the anode and/or of the cathode of the corresponding light emitting diode element. The setpoint value can for example be empirically determined, stored and then predefined.

In accordance with one development, the input of the section, and the output of the section are electrically coupled only after a predefined time duration after the interrupting of the supplying of the section with energy. The predefined time duration can be in a range for example of 50 μs to 60 s, for example of 500 μs to 1 s, for example of 1 ms to 500 ms, for example of 10 ms to 100 ms. This can contribute to being able to precisely determine the maximum value and/or to reliably identifying the short circuit.

In accordance with one development, the method involves determining after what time duration after the interrupting of the supplying of the section with energy a voltage across the section of the component string corresponds to a sum of the threshold voltages of all the light emitting diode elements of the section, and wherein the determined time duration is predefined as the predefined time duration. In other words, the input and the output are electrically coupled and the maximum value of the discharge current is detected only when the respective electrical voltages across the light emitting diode elements of the section have dropped to the threshold voltage thereof. The time duration can for example be empirically determined, stored and then predefined. This can contribute to being able to precisely determine the maximum value and/or to reliably identifying the short circuit.

In accordance with one development, the supply of the section with energy is interrupted by a driver circuit for operating the component string being switched off or an electrical connection between the driver circuit and the component string being interrupted. This can contribute to interrupting the supply of the component string with energy reliably and/or in a simple manner. The driver circuit can be switched off for example by means of a computing unit for driving, regulating or operating the driver circuit. The electrical connection between the driver circuit and the component string can be interrupted for example by means of a corresponding switch.

In accordance with one development, firstly it is determined whether a first section of the component string that includes a first light emitting diode element has a short circuit by virtue of the fact that an input of the first section of the component string is electrically coupled to an output of the first section of the component string and a first maximum value of the electrical discharge current which flows via the electrical coupling of the first section is detected. If it is identified that the first section has no short circuit, the detected first maximum value is predefined as a setpoint value. The electrical coupling between the input and the output of the first section is interrupted. The first section of the component string and a second section of the component string, said second section being connected in series with the first section and including at least one second light emitting diode element, are supplied with energy. The supply of the first section and of the second section with energy is interrupted again. An input of the first section and an output of the second section are electrically coupled to one another. A second maximum value of an electrical discharge current which flows via the electrical coupling of the input of the first section and of the output of the second section is detected. The detected second maximum value is compared with the predefined setpoint value. It is identified that the second section has a short circuit if the detected second maximum value is less than the predefined setpoint value. It is identified that the second section has no short circuit if the detected second maximum value is equal or at least approximately equal to or greater than the predefined setpoint value.

In other words, the method is carried out twice, firstly in the case of the first section and then in the case of the entire component string, in particular the first and second sections. If the first section includes exactly one light emitting diode element, namely the first light emitting diode element, then the presence of the short circuit in the first section can be identified in a simple manner if the first maximum value is zero or approximately zero. If the short circuit is not present, then the first maximum value is not equal to zero and, if the light emitting diode element of the first section is similar or identical to the light emitting diode element(s) of the second section, said first maximum value can be used as a reference value, in particular as a setpoint value, for further measurements, in particular in the second section, since the detected maximum values are independent of the number of light emitting diode elements in one of the sections. This can contribute to largely or even completely eliminating interfering influences, such as temperature and/or aging, on the identification of the short circuit, since the first light emitting diode element in the first section is generally subject to the same influences as the other light emitting diode elements in the second section, and since the interfering influences have therefore already affected the first maximum value, which was detected in the first section, and have thus been taken into account.

In accordance with one development, firstly it is determined whether a first section of the component string that includes a first light emitting diode element has a short circuit by virtue of the fact that an input of the first section of the component string is electrically coupled to an output of the first section of the component string, a first maximum value of the electrical discharge current which flows via the electrical coupling of the first section is detected, and the first maximum value is compared with a first predefined setpoint value. The electrical coupling between the input and the output of the first section is interrupted. A second section of the component string, said second section being connected in series with the first section and including at least one second light emitting diode element, is supplied with energy. The supply of the second section with energy is interrupted. An input of the second section and an output of the second section are electrically coupled to one another. A second maximum value of an electrical discharge current which flows via the electrical coupling of the second section is detected. The detected second maximum value is compared with a predefined second setpoint value. It is identified that the second section has a short circuit if the detected second maximum value is less than the predefined second setpoint value. It is identified that the second section has no short circuit if the detected second maximum value is equal or at least approximately equal to or greater than the predefined second setpoint value. The second setpoint value can be equal to the first setpoint value. The second setpoint value can be equal to the first detected maximum value or the first detected maximum value can be predefined as the second setpoint value.

In other words, the method is carried out at least twice, firstly in the case of the first section and then in the case of the second section and/or in the case of the entire component string. Furthermore, the component string can be subdivided into further sections and the method can be carried out correspondingly more frequently. The shorter the section, the more pronounced the difference in the maximum value of the discharge current between the section having a short circuit and the section without a short circuit. This can contribute to realizing a particularly high identification accuracy, wherein a fault tolerance is higher, and/or to largely eliminating interfering influences, such as temperature and/or aging, on the identification of the short circuit.

In accordance with one development, the setpoint value for determining the short circuit in one of the sections is predefined such that it corresponds to a quotient of a threshold voltage and an electrode resistance of one of the light emitting diode elements that the section includes. The threshold voltage can be designated in German as Schleusenspannung and also as Schwellenspannung. The setpoint value is thus predefined depending on one of the light emitting diode elements and is independent of the number of light emitting diode elements in the corresponding section, component string and/or in the corresponding optoelectronic assembly.

The objects are achieved in accordance with another aspect by means of an optoelectronic assembly. The optoelectronic assembly includes: at least the component string having at least the section, wherein the section includes the at least one light emitting diode element; an energy source electrically coupled to the component string and serving for supplying the component string with electrical energy; a first switch for interrupting the supply of the component string with energy; a second switch for electrically coupling the input of the section of the component string to the output of the section of the component string; a current measuring unit for detecting the maximum value of the electrical discharge current which flows via the electrical coupling of the section; an evaluation unit, which is configured to determine, depending on the detected maximum value, whether the section of the component string, in particular the light emitting diode element of the component string, has the short circuit.

The optoelectronic assembly is suitable for carrying out the method explained above. In particular, the supply of the component string with energy can be provided or interrupted by the first switch, and the electrical coupling between the input and the output of the section can be produced and interrupted by means of the second switch. The advantages and developments mentioned with respect to the method can readily be applied to corresponding advantages and developments of the optoelectronic assembly. The energy source can for example be the driver circuit, be designated as driver circuit or be a part of the driver circuit.

In accordance with one development, the first switch is designed such that the driver circuit for operating the component string can be switched on or switched off by means of the first switch or that an electrical connection between the driver circuit and the component string can be connected or interrupted.

In accordance with one development, the component string includes the first section and the second section, which is electrically connected in series with the first section. The first section includes at least the first light emitting diode element. The second section includes at least the second light emitting diode element. The optoelectronic assembly includes a third switch, which in its first switching state electrically couples an output of the first section to an output of the second section and which in its second switching state electrically isolates the output of the first section and the output of the second section from one another and which is electrically coupled to the second switch. The third switch makes it possible to check the first section independently of the second section with regard to the presence of the short circuit.

In accordance with one development, the optoelectronic assembly includes a fourth switch, which in its first switching state electrically couples the input of the first section to the input of the second section and which in its second switching state electrically isolates the input of the first section and the input of the second section from one another and which is electrically coupled to the third switch The fourth switch makes it possible to examine the second section independently of the first section with regard to the short circuit.

In accordance with one development, at least one of the light emitting diode elements is an inorganic light emitting diode or a part of an inorganic light emitting diode, and in parallel with the inorganic light emitting diode a capacitor and an electrical resistance are connected in series. The capacitor and the electrical resistance make it possible, in the case of the inorganic light emitting diode, to carry out the method explained above and to reliably identify the short circuit. Since the electrodes of an inorganic light emitting diode are relatively small compared with an OLED and have a relatively low electrical resistance and a low capacitance, the capacitor and the electrical resistance provide for electronic conditions in the optoelectronic assembly which make it possible to carry out the method. In particular, after interrupting the supplying of the component string with energy, the total voltage across the component string corresponds to the sum of the voltages across the capacitors, wherein, in the case of a short circuit, the corresponding capacitor can discharge rapidly via the resistance. Alternatively or additionally, at least one of the light emitting diode elements is an organic light emitting diode or a segment of an organic light emitting diode.

In accordance with one development, at least one section of the component string includes at least two light emitting diode elements.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 9 shows a diagram with exemplary profiles of voltages and currents;

FIG. 10 shows a table with exemplary measurement results;

FIG. 11 shows a circuit diagram of one exemplary embodiment of an optoelectronic assembly;

FIG. 12 shows a circuit diagram of one exemplary embodiment of an optoelectronic assembly.

DETAILED DESCRIPTION

In the following detailed description, reference is made to the accompanying drawings, which form part of this description and show for illustration purposes specific exemplary embodiments in which the present disclosure can be implemented. In this regard, direction terminology such as, for instance, "at the top", "at the bottom", "at the front", "at the back", "front", "rear", etc. is used with respect to the orientation of the figure(s) described. Since component parts of exemplary embodiments can be positioned in a number of different orientations, the direction terminology serves for illustration and is not restrictive in any way whatsoever. It goes without saying that other exemplary embodiments can be used and structural or logical changes can be made, without departing from the scope of protection of the present invention. It goes without saying that the features of the various exemplary embodiments described herein can be combined with one another, unless specifically indicated otherwise. Therefore, the following detailed description should not be interpreted in a restrictive sense, and the scope of protection of the present disclosure is defined by the appended claims.

In the context of this description, the terms "connected" and "coupled" are used to describe both a direct and an indirect connection and a direct or indirect coupling. In the figures, identical or similar elements are provided with identical reference signs, insofar as this is expedient.

An optoelectronic assembly may include one, two or more light emitting diode elements. Optionally, an optoelectronic assembly can also include one, two or more electronic components. An electronic component may include for example an active and/or a passive component. An active electronic component may include for example a driver circuit, an energy source, a computing, control and/or regulating unit and/or a transistor. A passive electronic component may include for example a capacitor, a resistor, a diode or a coil.

A light emitting diode element can be an electromagnetic radiation emitting semiconductor light emitting diode element, an inorganic light emitting diode (LED) and/or an organic light emitting diode (OLED). However, a light emitting diode element can also be only a part or a segment of a light emitting diode, for example of an LED or of an OLED. By way of example, the OLED can be segmented and include a light emitting diode element in each segment. A plurality of light emitting diode elements in a light emitting diode can be electrically connected in parallel and/or electrically connected in series. A light emitting diode element can be part of an integrated circuit. Furthermore, a plurality of light emitting diode elements can be provided, for example in a manner accommodated in a common housing. A light emitting diode element can emit for example light in the visible range, UV light and/or infrared light.

Figure 1:
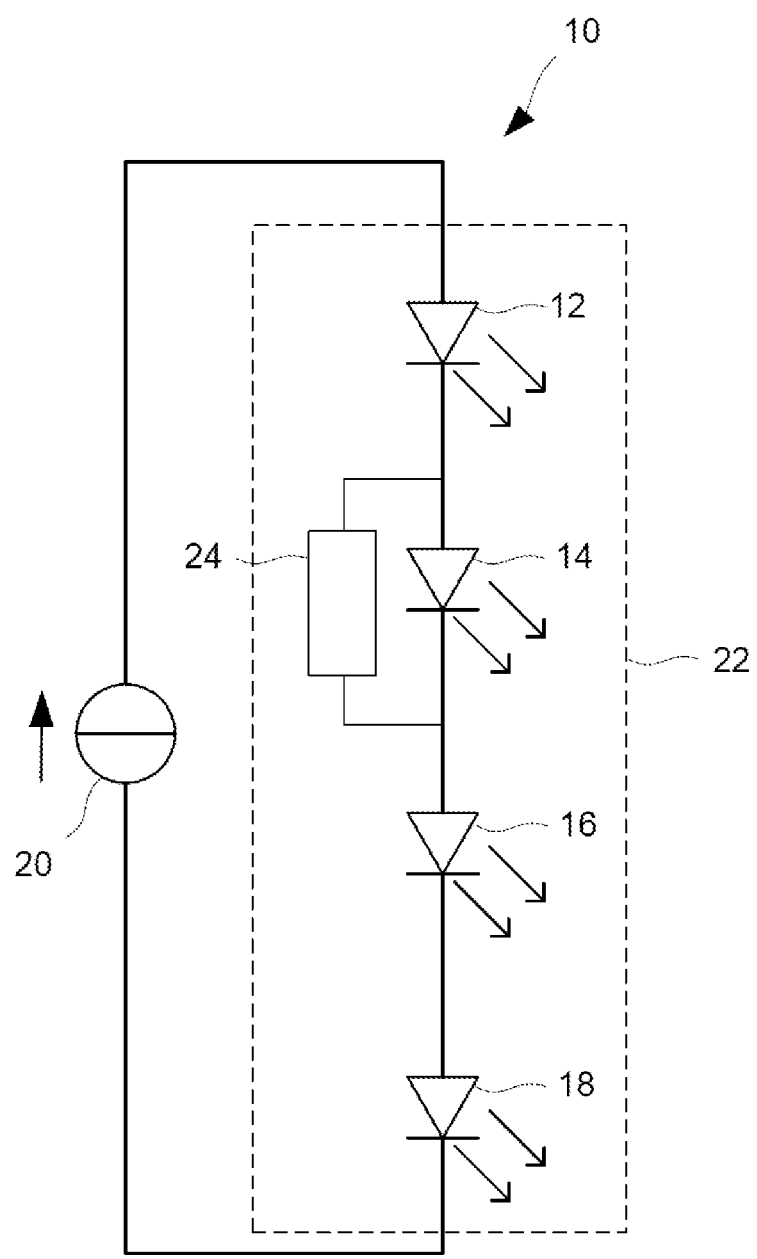
FIG. 1 shows a circuit diagram of a conventional optoelectronic assembly.

FIG. 1 shows a conventional optoelectronic assembly 10 including a first light emitting diode element 12, a second light emitting diode element 14, a third light emitting diode element 16 and a fourth light emitting diode element 18. The light emitting diode elements 12, 14, 16, 18 are arranged in a component string 22 of the assembly 10. The light emitting diode elements 12, 14, 16, 18 are electrically connected in series. A driver circuit 20 is arranged and serves for operating, in particular for controlling or regulating, the light emitting diode elements 12, 14, 16, 18.

The second light emitting diode element 14 has a short circuit, depicted as short-circuit resistance 24 in FIG. 1. The short-circuit resistance 24 is electrically connected in parallel with the second light emitting diode element 14 and behaves electrically similarly to an ohmic resistance. The value of the ohmic resistance depends on the nature of the short circuit, for example on an area of the short circuit.

Figure 2:
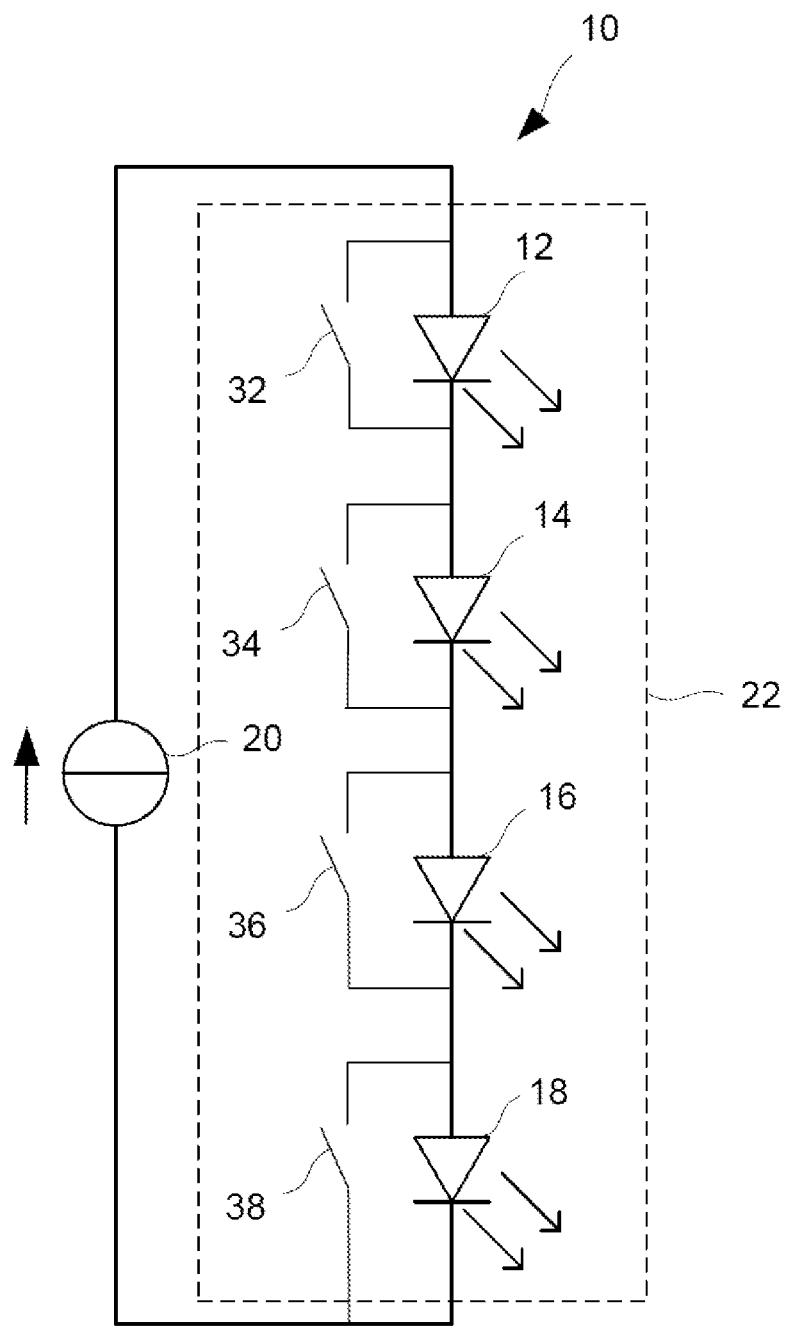
FIG. 2 shows a circuit diagram of a conventional optoelectronic assembly.

FIG. 2 shows a conventional optoelectronic assembly 10. The conventional optoelectronic assembly 10 can for example largely correspond to the conventional optoelectronic assembly 10 shown in FIG. 1. The light emitting diode elements 12, 14, 16, 18 are electrically connected in parallel with respectively a switch, for example a first transistor 32, a second transistor 34, a third transistor 36 and a fourth transistor 36. The current can thus be conducted individually past each light emitting diode element 12, 14, 16, 18 and nevertheless through the other light emitting diode elements 12, 14, 16, 18.

Figure 3:
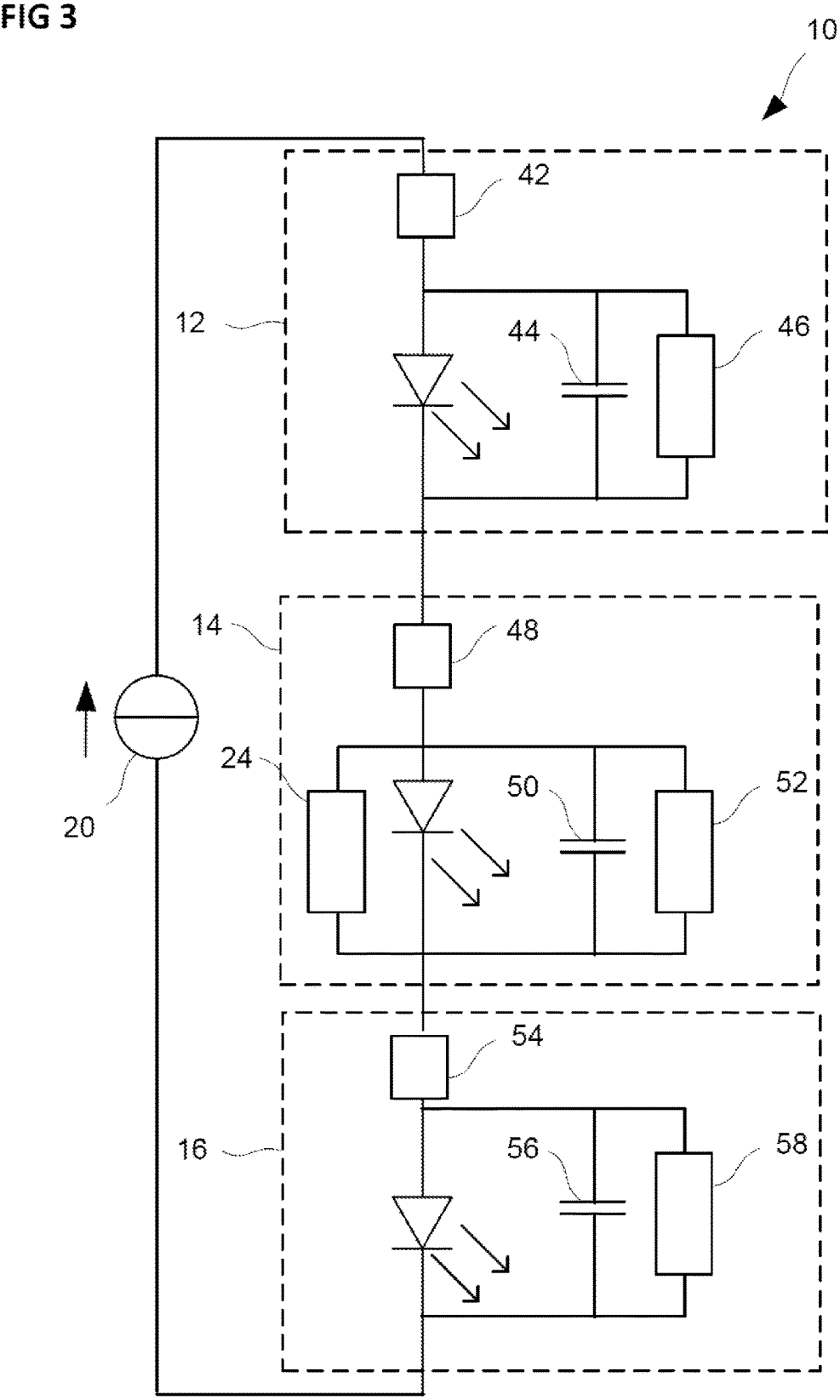
FIG. 3 shows a circuit diagram of a conventional optoelectronic assembly.

FIG. 3 shows a conventional optoelectronic assembly 10 that largely corresponds to the optoelectronic assembly 10 shown in FIG. 1, wherein the optoelectronic assembly 10 includes only three light emitting diode elements 12, 14, 16. The light emitting diode elements 12, 14, 16 are illustrated by means of equivalent circuit diagrams in FIG. 3. In the equivalent circuit diagrams, intrinsic capacitances 44, 50, 56 and electrode resistances 42, 48, 54 and bulk resistances 46, 52, 58 are depicted for each light emitting diode element 12, 14, 16. In other words, on account of their intrinsic properties, the light emitting diode elements 12, 14, 16 have capacitances and resistances, which are depicted as independent electronic components alongside the diode symbols in FIG. 3. In the equivalent circuit diagram, the diode symbols are merely representative of the light emitting layers of the light emitting diode elements 12, 14, 16. FIG. 3 and, in particular, the equivalent circuit diagrams shown in FIG. 3 serve to afford a better understanding of the optoelectronic assemblies and methods for operating the corresponding optoelectronic assemblies explained with reference to the subsequent figures.

The first light emitting diode element 12 has a first electrode resistance 42, a first intrinsic capacitance, illustrated as first capacitor 44, and a first bulk resistance 46. The second light emitting diode element 14 has a second electrode resistance 48, a second intrinsic capacitance, illustrated as second capacitor 50, and a second bulk resistance 52. The third light emitting diode element 16 has a third electrode resistance 54, a third intrinsic capacitance, illustrated as third capacitor 56, and a third bulk resistance 58.

The light emitting diode elements 12, 14, 16 are OLEDs and the electrode resistances 42, 48, 54 are the ohmic resistances of the anodes, in particular of ITO layers, and of the cathodes of the OLEDs. The intrinsic capacitances correspond to the capacitors 44, 50, 56, which are formed by a respective anode-cathode pair of the OLEDs. The bulk resistances 46, 52, 58 correspond to the bulk resistances typical of diodes and enable leakage currents to flow via the light emitting diode elements 12, 14, 16.

As an alternative thereto, the light emitting diode elements 12, 14, 16 can also be LEDs, wherein the values of the resistances and/or of the capacitances can then be lower than in the case of the OLEDs.

The second electrode resistance 48 is electrically connected in series with the short-circuit resistance 24. The short-circuit resistance 24 is electrically connected in parallel with the second capacitor 50 and the second bulk resistance 52.

The electronic properties of the conventional optoelectronic assembly 10, which are discernible with the aid of the equivalent circuit diagrams, are utilized hereinafter to provide an optoelectronic assembly and/or a method for operating an optoelectronic assembly in which a short circuit of one of the light emitting diode elements 12, 14, 16 can be identified simply and reliably.

Figure 4:
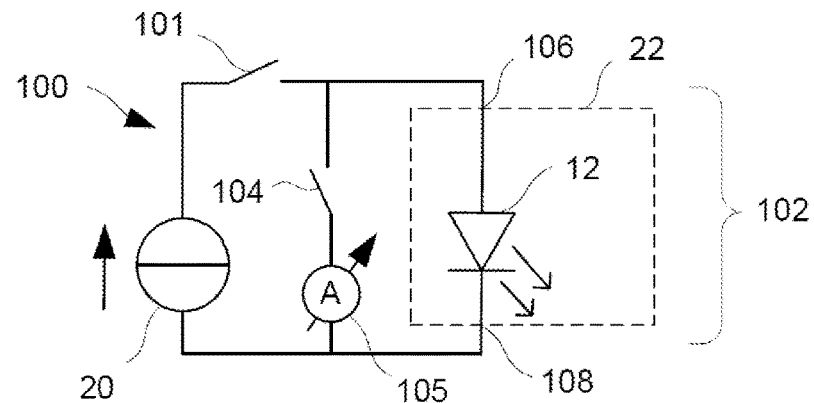
FIG. 4 shows a circuit diagram of one exemplary embodiment of an optoelectronic assembly.

FIG. 4 shows one exemplary embodiment of an optoelectronic assembly 100. The assembly 100 includes the component string 22 and the first light emitting diode element 12. The first light emitting diode element 12 has the intrinsic capacitance and the intrinsic electrode resistance, which are not shown in FIG. 4 for reasons of clarity.

The component string 22 includes a section 102, the first light emitting diode element 12 being arranged therein. The section 102 includes an input 106 of the section and an output 108 of the section 102. A first switch 101 is electrically coupled to the input 106 of the section 102 and to the driver circuit 20. The first switch 101 in its first switching state brings about an electrical coupling between the input 106 of the section 102 and the driver circuit 20, and is thus closed in its first switching state, and in its second switching state prevents said electrical coupling, and is thus open in its second switching state. A second switch 104 is electrically coupled to the input 106 and the output 108. The second switch 104 in its first switching state brings about an electrical coupling between the input 106 and the output 108, and is thus closed in its first switching state, and interrupts said electrical coupling in its second switching state, and is thus open in its second switching state. With the second switch 104 closed, the input 106 and/or the output 108 are/is electrically connected in series with a current measuring device 105, in particular a first current measuring device 105, and electrically coupled to one another via the latter. In other words, the electrical coupling between the input 106 and the output 108 is effected via the current measuring device 105. With the second switch 104 closed, the current measuring device 105 makes it possible to detect a discharge current which flows from the input 106 to the output 108 or from the output 108 to the input 106. The current measuring device 105 is arranged between the second switch 104 and the output 108, wherein the current measuring device 105 can additionally be arranged between the driver circuit and the output 108, which makes it possible to use the current measuring device 105 for regulating the optoelectronic assembly 100 during the normal operation of the optoelectronic assembly 100. The current measuring device 105 can alternatively be arranged between the second switch 104 and the input 106, wherein the current measuring device 105 can additionally be arranged between the first switch 101 and the input 106, which makes it possible to use the current measuring device 105 for regulating the optoelectronic assembly 100 during the normal operation of the optoelectronic assembly 100.

In the case of the optoelectronic assembly 100, it is possible to check in a simple manner whether an electrical short circuit is present in the first light emitting diode element 12. In the case of an intact first light emitting diode element 12, that is to say if there is no short circuit present at the first light emitting diode element 12, after the supply of the component string 22 with electrical energy has been interrupted, the first light emitting diode element 12 discharges via the optically functional layer structure, in particular the layers that emit light during normal operation, of the first light emitting diode element 12 and the intrinsic bulk resistance of the light emitting diode element 12 initially just until only its threshold voltage, corresponding to the voltage across the intrinsic capacitance of the first light emitting diode element 12, is present at the first light emitting diode element 12, since the light emitting diode element 12 is still electrically conductive up to the threshold voltage. If the threshold voltage is reached, the intrinsic capacitance of the first capacitor 44 then discharges only very slowly via the bulk resistance. In the case where the input 106 is electrically coupled to the output 108 via the first switch 104, a short discharge current flows via the electrical coupling on account of said threshold voltage. In the case of an intact first light emitting diode element 12, the maximum value of the discharge current corresponds to the quotient of the threshold voltage and the electrode resistance of the first light emitting diode element 12, lead resistances and contact resistances being disregarded. The electrode resistance of the first light emitting diode element 12 can be predefined as a setpoint value for the maximum value in the case of an intact light emitting diode element 12. If the short circuit is present at the first light emitting diode element 12, then the first light emitting diode element 12 already discharges before the electrical coupling of the input 106 to the output 108 via the short circuit and, upon the electrical coupling of the input 106 to the output 108, discharge current no longer flows or, if the intrinsic capacitance has not yet been entirely discharged, only a very small discharge current flows, via the second switch 104.

In order to check the first light emitting diode element 12 with regard to the short circuit, therefore, firstly the first switch 101 is switched into its first switching state, that is to say is closed, and the second switch 104 is switched into its second switching state, that is to say is opened. The component string 22 and, in particular, the first light emitting diode element 12 are supplied with electrical energy by means of the driver circuit 20. Next, the driver circuit 20 is switched off and/or the first switch 101 is opened, such that the supply of the component string 22 with electrical energy is interrupted. After a predefined time duration, the second switch 104 is closed, such that a direct electrical coupling between the input 106 and the output 108 is produced. In other words, the input 106 and the output 108 are short-circuited via the second switch 104. At the same time, the discharge current which flows upon the electrical coupling of the input 106 to the output 108 via the second switch 104 is detected by means of the current measuring device 105. In particular, the maximum value of the discharge current is detected. If the discharge current and/or the maximum value of the discharge current are/is equal to zero or approximately equal to zero, then it is identified that a short circuit is present at the first light emitting diode element 12. If the maximum value of the discharge current is not equal to zero, in particular is greater than zero, and/or corresponds for example to a predefined setpoint value of the discharge current, then it is identified that no short circuit is present. If appropriate, the predefined setpoint value can be stored on a storage unit of an evaluation unit and/or computing unit for checking the optoelectronic assembly 100 with regard to the short circuit.

The predefined time duration can for example be determined empirically. By way of example, it is possible to determine after what time duration after the interrupting of the supplying of the component string 22 with energy a voltage across the section 102 of the component string 22 corresponds to a sum of the threshold voltages of all the light emitting diode elements 12 of the section 102. The time duration thus determined can be predefined as the predefined time duration. In other words, the input 106 and the output 108 are electrically coupled and the maximum value of the discharge current is detected only when the respective voltages across the light emitting diode elements 12 of the section 102 have dropped to the threshold voltage thereof. The predefined time duration can be in a range for example of 50 μs to 60 s, for example of 500 μs to 1 s, for example of 1 ms to 500 ms, for example of 10 ms to 100 ms. This can contribute to being able to precisely determine the maximum value and/or to reliably identifying the short circuit.

The above-explained method for operating the optoelectronic assembly 100 can be run through for example as a special test scenario, for example when switching off the driver circuit 20 and/or, in the automotive sector, when switching off the automobile luminaire including the optoelectronic assembly 100. Alternatively or additionally, the test method can be carried out once, repeatedly and/or regularly in one or more pulse pauses in the case of pulsed operation (PWM operation) of the optoelectronic assembly 100, for example if the latter is part of a flashing indicator of a motor vehicle.

Figure 5:
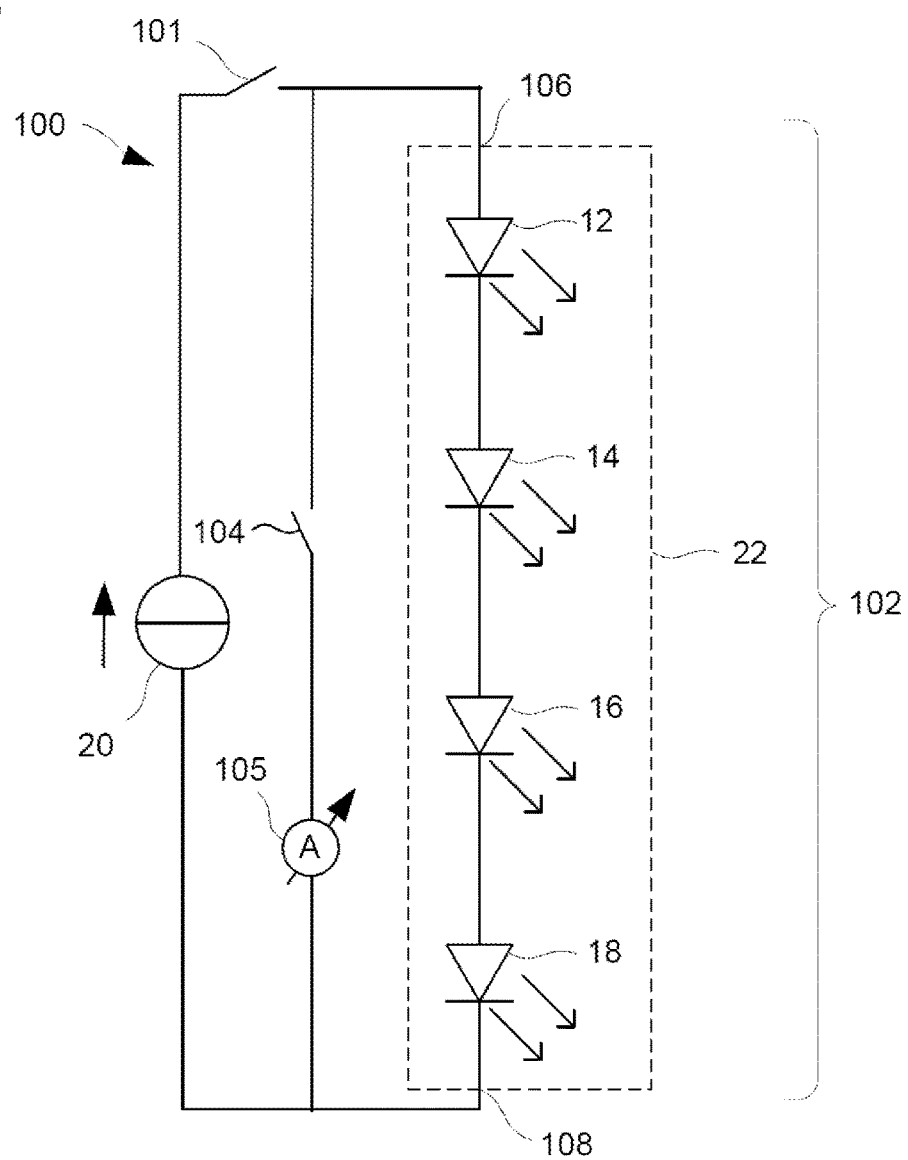
FIG. 5 shows a circuit diagram of one exemplary embodiment of an optoelectronic assembly.

FIG. 5 shows a circuit diagram of one exemplary embodiment of an optoelectronic assembly 100, which for example can largely correspond to the optoelectronic assembly 100 shown in FIG. 4. The optoelectronic assembly 100 includes four light emitting diode elements 12, 14, 16, 18, which are electrically connected in series in the component string 22 and the section 102.

If the light emitting diode elements 12, 14, 16, 18 have no short circuit, then they discharge after the interrupting of the supplying of the component string 22 with energy, in particular after the opening of the first switch 101, on account of their intrinsic capacitances via their intrinsic bulk resistances and organic functional layer structures to their threshold voltages, wherein the individual threshold voltages add up to form a total voltage across the component string 22. The total voltage thus corresponds to a sum of the individual voltages. In the case of four light emitting diode elements 12, 14, 16, 18, the total voltage corresponds to four times the individual voltages. In other words, on account of the intrinsic capacitances, a residual amount of energy remains stored in the light emitting diode elements 12, 14, 16, 18, which is measurable as the total voltage. A total electrical resistance across the section 102 results from the sum of the electrode resistances of the light emitting diode elements 12, 14, 16, 18. Given a predefined number n of light emitting diode elements 12, 14, 16, 18, said total resistance is always the same, independently of whether or not one of the light emitting diode elements 12, 14, 16, 18 has a short circuit. The maximum value of the discharge current therefore corresponds to the quotient of n times the threshold voltages and n times the electrode resistances, wherein n can be canceled and the quotient is independent of the number n of light emitting diode elements 12, 14, 16, 18.

If the short circuit is present at one of the light emitting diode elements 12, 14, 16, 18, for example at the second light emitting diode element 14, then the energy stored in said second light emitting diode element 14 discharges via the short-circuit resistance 24 and the total voltage decreases by this one threshold voltage. The total resistance across the section 102, which results from the sum of the intrinsic electrode resistances, remains the same, however, for which reason the value of the quotient and thus the maximum value of the discharge current decrease. Upon the electrical coupling of the input 106 to the output 108 via the second switch 104, the energy stored in the component string 22 thus discharges via the second switch 104 and the maximum value of the discharge current is measurable by means of the current measuring device 105. The maximum value of the discharge current corresponds to the quotient of the sum of the threshold voltages of the intact light emitting diode elements 12, 16, 18 and the electrode resistances of all the light emitting diode elements 12, 14, 16, 18. That is to say that, given the number of n light emitting diode elements 12, 14, 16, 18, the maximum value of the discharge current in the case where the short circuit is present is lower than in the case of exclusively intact light emitting diode elements 12, 14, 16, 18 by the maximum value multiplied by 1/n. The deviation of the detected maximum value from the predefined setpoint value can be identified by means of a computing unit (not illustrated), for example an evaluation unit, which is coupled to the current measuring device 105 and/or the driver circuit 20. The predefined setpoint value can be stored for example in the computing unit or the evaluation unit. Temperature influences on the maximum value of the discharge current can be eliminated or at least minimized by the checking with regard to the short circuit always being carried out at the same temperature, for example using a temperature sensor (not illustrated).

In the method, therefore, after interrupting the energy supply of the component string 22, the section 102 to be examined of the component string 22 is short-circuited via the electrical coupling of the input 106 to the output 108 by means of the second switch 104 and the maximum value of the discharge current is measured. Said maximum value of the discharge current is not significantly dependent on the number of light emitting diode elements 12, 14, 16, 18 in the component string 22, in particular the section 102. The discharge current via the electrical coupling reaches the maximum value at the instant of the electrical coupling and directly after the electrical coupling. The discharge current then decreases since the total capacitance (Ctot) of the section 102, which is determined by the capacitances of the light emitting diode elements 12, 14, 16, 18 of the section 102 (see FIG. 3), discharges with the time constant T=Rtot*Ctot. The maximum value (I_MAX) results as $$I\_MAX = Utot/Rtot.$$

The total resistance Rtot of the section 102 results approximately from the sum of the resistance values Rele of the electrode resistances 42, 48, 54; furthermore, the total resistance Rtot can also include line resistances and/or an electrical resistance of a current measuring device, but these are disregarded in this exemplary embodiment. In practice, the current measuring device can advantageously be chosen such that it has a small electrical resistance, in particular a negligible electrical resistance. If no short circuit is present, then the maximum value I_MAX of the discharge current results as $$I\_MAX = n \times Uf/(n \times Rele) = Uf/Rele,$$

Since the number n of the light emitting diode elements is canceled out. That is to say that the maximum value I_MAX of the discharge current is not dependent on the number n of light emitting diode elements 12, 14, 16, 18.

In the case of a short circuit at one of the light emitting diode elements 12, 14, 16, 18, that is to say in the case of a number (n−1) of entirely satisfactory light emitting diode elements 12, 16, 18 and one short-circuited light emitting diode element 14, the short-circuited light emitting diode element 14 discharges very rapidly via the short-circuit resistance 24 and the voltage present shortly before the electrical coupling decreases by an individual voltage Uf. The number of electrode resistances Rele remains the same, however, which means that the maximum value I_MAX of the discharge current in the case where a short circuit is present must be lower than in the case of a component string 22, in particular a section 102, without a short-circuited light emitting diode element 14. In particular, the maximum value of the discharge current results as $$I\_MAX = Uf \times (n-1)/(n \times Rele) = (Uf/Rele) \times (n-1)/n.$$

If a light emitting diode element 12, 14, 16, 18 having a short circuit is present, then the maximum value I_MAX of the discharge current is thus reduced by the factor (n−1)/n compared with the case of an entirely satisfactory component string 22 without a short-circuited light emitting diode element 12, 14, 16, 18. Moreover, the maximum value I_MAX of the discharge current is independent of the string length, that is to say the number n of light emitting diode elements 12, 14, 16, 18 in the section 102, i.e. said maximum value can be fixedly programmed into a corresponding evaluation unit. In particular, it holds true approximately that I_MAX(n=7)=I_MAX(n=6)>I_MAX(n=7), but a short circuit).

In the case of string lengths of 2 to 7 components, for example, which is typical for SELV<60 V, for example, the maximum value I_MAX upon the occurrence of a short circuit decreases to a value of 86% (string of 7) to 50% (string of 2). Consequently, with 7 light emitting diode elements 12, 14, 16, 18, there is a systematic identification margin of 14%.

Alternatively, the optoelectronic assembly 100 may include more than one component string 22, more than one section 102 and/or more or fewer light emitting diode elements 12, 14, 16, 18.

Figure 6:
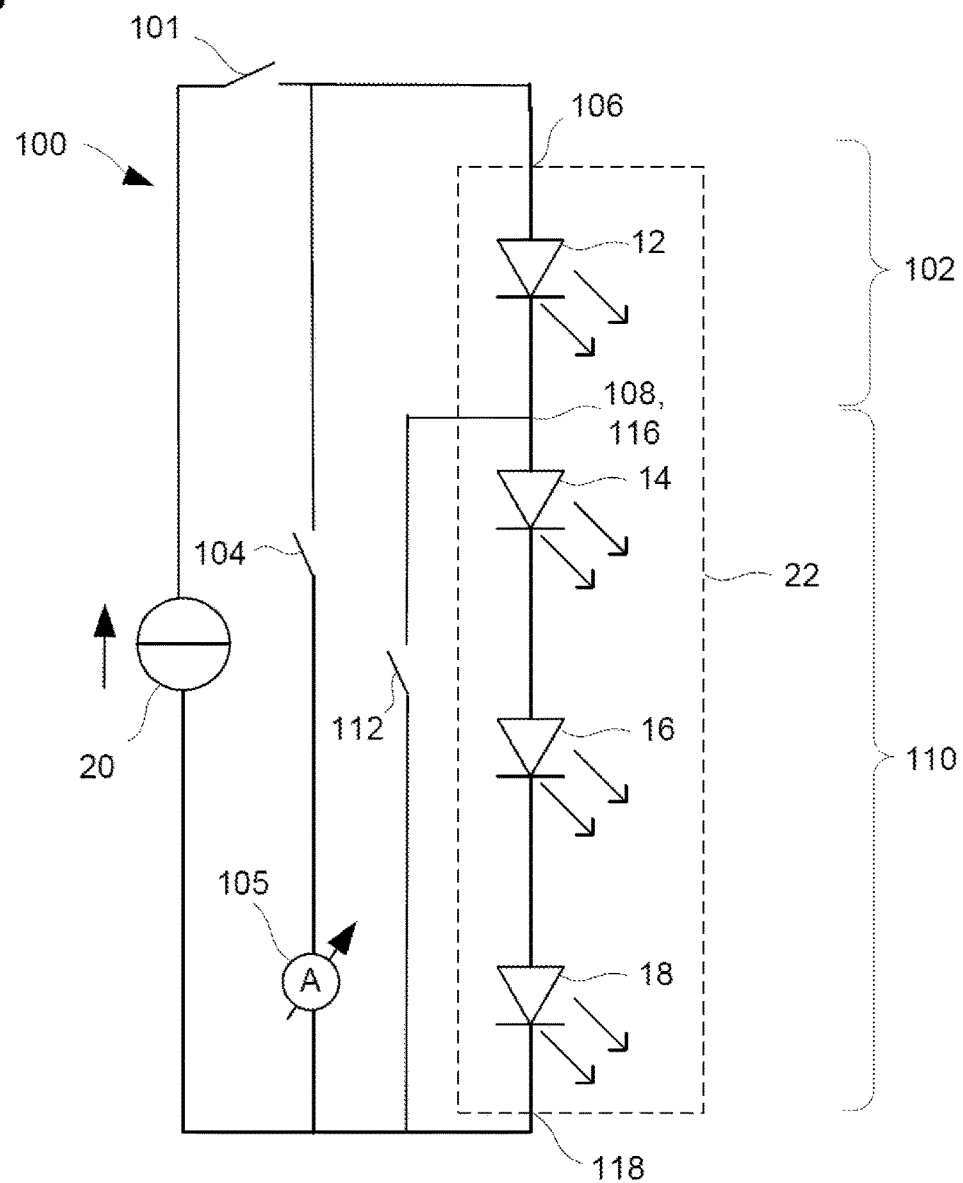
FIG. 6 shows a circuit diagram of one exemplary embodiment of an optoelectronic assembly.

FIG. 6 shows a circuit diagram of one exemplary embodiment of an optoelectronic assembly 100, which for example can largely correspond to the optoelectronic assembly 100 shown in FIG. 5. The optoelectronic assembly 100 includes the component string 22, wherein the component string 22 includes the section 102, which is designated as first section 102 in this context, and a second section 110. The first section 102 includes the input 106 and the output 108, which are designated as first input 106 and as first output 108, respectively, in this context. The second section 110 includes a second input 116 and a second output 118. The first output 108 can correspond to the second input 116 or can be directly electrically coupled to the latter.

A third switch 112 is electrically connected in parallel with the second section 110. The third switch 112 is electrically coupled firstly to the first output 108 and/or the second input 116 and secondly to the second output 118, the current measuring device 105 and the driver circuit 20. The third switch 112 in its first switching state electrically couples the first output 108 to the second output 118 and/or the second switch 104. In other words, in the first switching state of the third switch 112, the current is diverted around the second section 110, such that only the first section 102 is supplied with energy. The third switch 112 is connected for example between the cathode of the component string or ground (GND) and a node between the first and second light emitting diode elements 12, 14 and, in the closed state, bridges all the light emitting diode elements 14, 16, 18, apart from the—in FIG. 6—topmost, in particular first, light emitting diode element 12 of the component string 22. Cost-effective N-MOSFETs or NPN transistors can be used for the second and/or third switch 104, 112.

If the third switch 112 is in its first switching state, the function of the optoelectronic assembly 100 shown in FIG. 6 corresponds to the optoelectronic assembly 100 shown in FIG. 4, wherein the first light emitting diode element 12 can be examined with regard to the short circuit in accordance with the optoelectronic assembly 100 shown in FIG. 4. In particular, at the beginning of examining with regard to the short circuit, firstly the third switch 112 can be closed and then the first switch 101 can be closed and the first section 102 can be supplied with energy, or firstly the first switch 101 can be closed and the entire component string 22 can be supplied with energy and then the third switch 112 can be closed. This is followed by coupling the first input 106 to the first output 108 by means of the second switch 104 and determining the maximum value of the discharge current via the current measuring device 105.

If it is identified that no short circuit is present in the case of the first light emitting diode element 12, the detected maximum value of the discharge current can be designated as first maximum value and can be predefined as a setpoint value for further measuring methods.

If the third switch 112 is in its second switching state, that is to say is open, then the functioning of the optoelectronic assembly 100 shown in FIG. 6 corresponds to the optoelectronic assembly 100 shown in FIG. 5. In contrast thereto, however, now when examining the second section 110 with regard to the short circuit of one of the light emitting diode elements 12, 14, 16, 18, the setpoint value determined and predefined previously in the first section 102 can be used as a reference and a comparison value. In particular, with the third switch 112 open, the first switch 101 can be closed and the component string 22 can be supplied with energy. This is followed by coupling the first input 106 to the second output 118 by means of the second switch 104 and determining a second maximum value of the discharge current via the current measuring device 105. The second maximum value can then be compared with the predefined setpoint value, in particular the first maximum value. If the second maximum value is equal or at least approximately equal to the first maximum value, then the second, third and fourth light emitting diode elements 14, 16, 18 have no short circuit. If the second maximum value is not equal or not at least approximately equal to the first maximum value, then the second, the third and/or the fourth light emitting diode element 14, 16, 18 have/has the short circuit (the first light emitting diode element 12 has already been examined).

Determining the first maximum value and predefining the first maximum value as a setpoint value if the first light emitting diode element 12 has no short circuit can be particularly advantageous if the second, third and fourth light emitting diode elements 14, 16, 18 are structurally identical to the first light emitting diode element 12 and are thus subject to the same aging, wear or temperature states as the first light emitting diode element 12. The influences of age, wear and/or temperature have then already affected the predefined setpoint value and thus already been taken into account and can thus be completely or at least partly eliminated. The examinations of the first light emitting diode element 12 and of the other light emitting diode elements 14, 16, 18 with regard to the short circuit should be carried out in rapid succession, for example successively within a maximum of a few seconds, in order that the temperature of the light emitting diode elements 12, 14, 16, 18 cannot change to an excessively great extent and corrupt the examination.

It is not necessary to have to preprogram or predefine a good/bad threshold in the form of a setpoint value for the discharge current and thus to design the optoelectronic assembly 100 for a specific type of light emitting diode elements 12, 14, 16, 18. In contrast thereto, a wide variety of types of light emitting diode elements 12, 14, 16, 18 can be arranged in the component string 22, as long as all are of the same type. The checking with regard to the short circuit is thus not only independent of the string length, but also independent of the type of light emitting diode elements 12, 14, 16, 18, in particular independent of the OLED type used. Furthermore, temperature and aging influences are minimized, with only one switch more, in particular the third switch 112, being additionally necessary. The third switch 112 can for example include a transistor or be formed by the latter. Furthermore, a simple and cost-effective driving of the third switch 112 is possible, since the control signal for the corresponding MOSFET can be related to ground.

Alternatively, the third switch 112 can also be connected between the input of the first section 102 and between the third and fourth light emitting diode elements 16, 18. The third switch 112 in the closed state then bridges the first, second and third light emitting diode elements 12, 14, 16, such that the last light emitting diode element of the component string 22, in particular the fourth light emitting diode element 18, can be operated and checked independently of the other light emitting diode elements.

Figure 7:
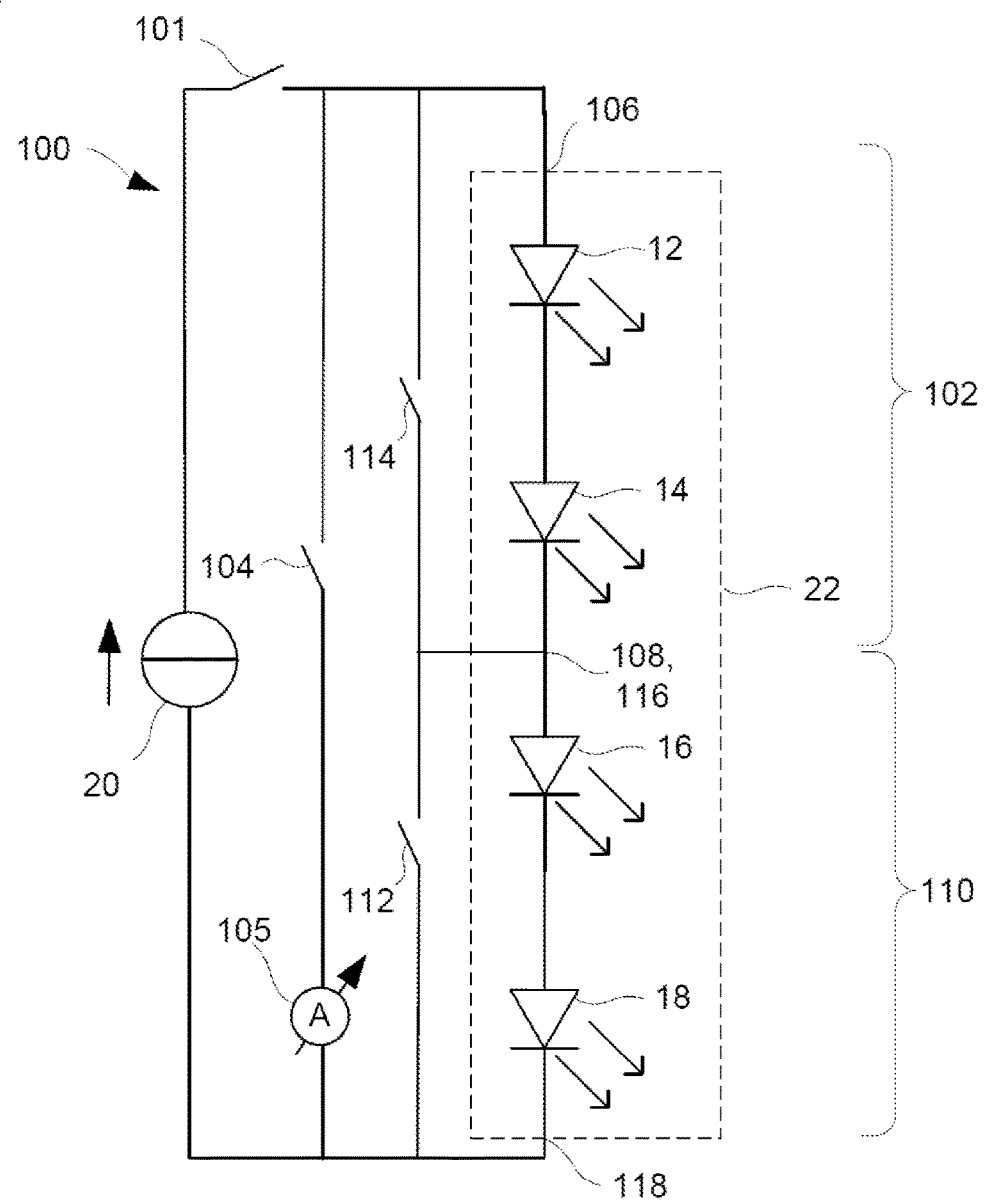
FIG. 7 shows a circuit diagram of one exemplary embodiment of an optoelectronic assembly.

FIG. 7 shows a circuit diagram of one exemplary embodiment of an optoelectronic assembly 100, which can be embodied for example in a manner largely corresponding to the optoelectronic assembly 100 shown in FIG. 6. The first section 102 includes at least the first and second light emitting diode elements 12, 14. The second section 110 includes at least the third and fourth light emitting diode elements 16, 18. The first output 108 and the second input 116 are arranged between the second light emitting diode element 14 and the third light emitting diode element 16. The third switch 112 is electrically coupled firstly to the first output 108 and/or the second input 116 and secondly to the second output 108. The third switch 112 is electrically connected in parallel with the second section 110. The third switch 112 in its first switching state electrically couples the first output 108 and the second output 118 directly to one another.

The assembly 100 includes a fourth switch 114. The fourth switch 114 is electrically coupled firstly to the first input 106 and secondly to the first output 108 and/or the second input 116. The fourth switch 114 is electrically connected in parallel with the first section 102. The fourth switch 114 in its first switching state electrically couples the first input 106 and the second input 108 directly to one another.

Consequently, with the third switch 112 closed and the fourth switch 114 open, only the first section 102 can be supplied with electrical energy and, with the fourth switch 114 closed and the third switch 112 open, only the second section 110 can be supplied with electrical energy.

When one of the sections 102, 110 is supplied with electrical energy, the intrinsic capacitances of the light emitting diode elements 12, 14, 16, 18 are charged and, when the energy supply is interrupted, discharge to the threshold voltages of the individual light emitting diode elements 12, 14, 16, 18, such that a total voltage consisting of the sum of the individual threshold voltages is established across the corresponding section 102, 110. With the closing of the second switch 104, the corresponding light emitting diode elements 12, 14, 16, 18 can then be discharged and the maximum value of the discharge current can be detected. Depending on the maximum value of the discharge current, in accordance with the methods explained above, for each of the sections 102, 110 individually it is possible to examine whether or not the corresponding section 102, 110 has a light emitting diode element 12, 14, 16, 18 having a short circuit. The examination with regard to the short circuit can be carried out in a manner substantially corresponding to the examinations explained above. Alternatively or additionally, the detected maximum values can be compared with one another, as a result of which a relative and/or redundant checking of the presence of a short circuit is possible.

In principle, when detecting the maximum value of the discharge current, the signature of the short circuit is all the more pronounced, the shorter the examined component string 22 or section 102, 110. The maximum value in the case of a short circuit decreases in principle to ((n−1)/n) times the maximum value without a short circuit. Given two light emitting diode elements 12, 14, for example, the maximum value decreases to 50% of its value in the case without a short circuit. This can be identified more reliably; in particular, this allows a greater variation, greater tolerances, greater temperature differences and/or aging phenomena than in the case of a component string 22 or section 102, 110 having eight light emitting diode elements 12, 14, 16, for example, in which the maximum value falls only to 87.5% of its value in the case without a short circuit.

In the case of the optoelectronic assembly 100 shown in FIG. 7, the component string 22 is halved by means of the sections 102, 110 and the third and fourth switches 112, 114 and the signature of a short circuit in the component string 22 becomes clearer. In return, it is necessary to carry out two checks instead of one. Optionally, even further switches can be added, for example if the component string 22 includes even further light emitting diode elements 12, 14, 16, 18.

Figure 8:
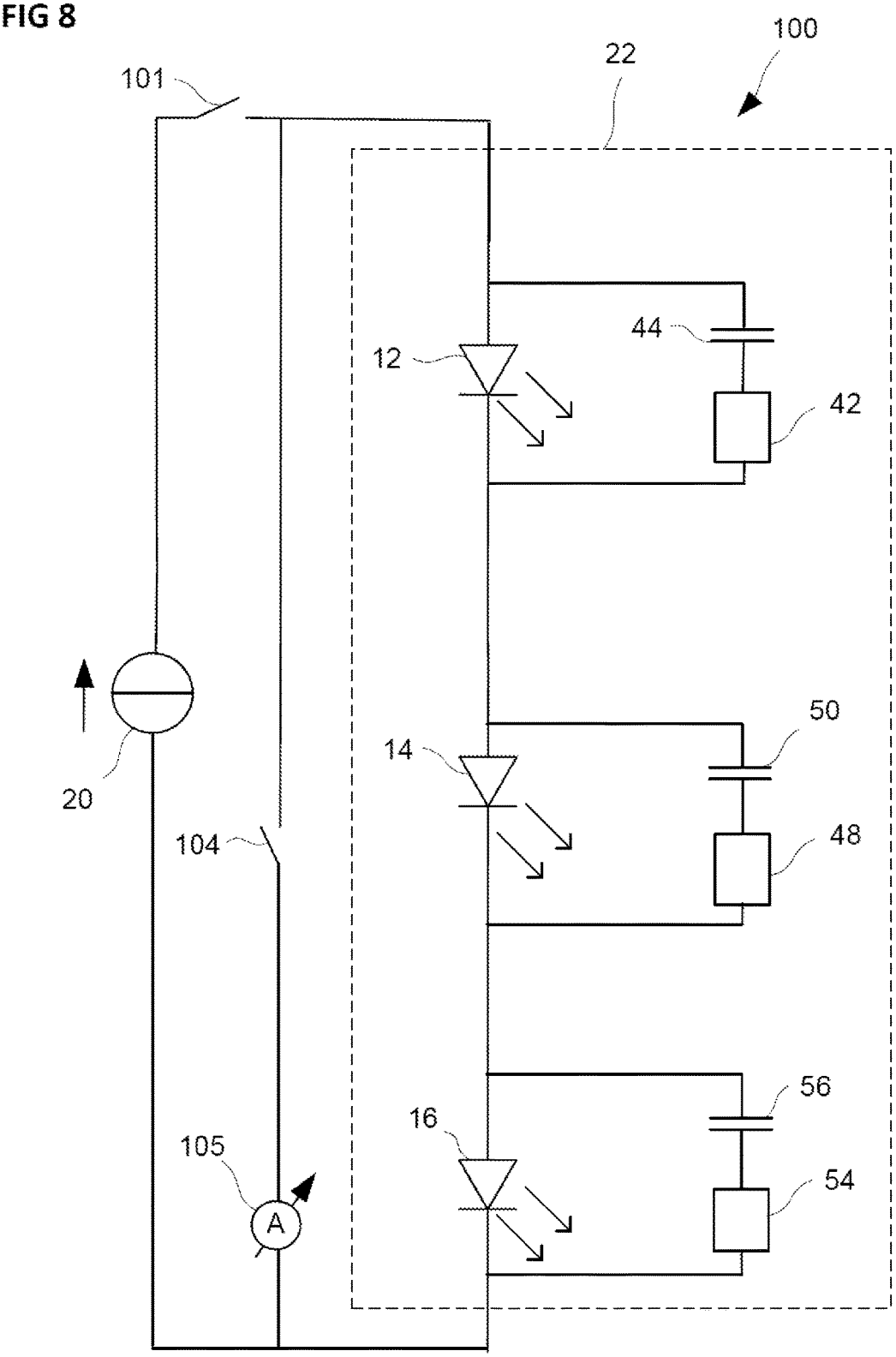
FIG. 8 shows a circuit diagram of one exemplary embodiment of an optoelectronic assembly.

FIG. 8 shows a circuit diagram of one exemplary embodiment of an optoelectronic assembly 100, which can largely correspond for example to the optoelectronic assembly 100 shown in FIG. 5. The optoelectronic assembly 100 includes inorganic light emitting diode elements 12, 14, 16. The inorganic light emitting diode elements 12, 14, 16, compared with organic light emitting diode elements, have relatively small electrodes and the electrode resistances and also the intrinsic capacitances are relatively low. Therefore, in the case of this optoelectronic assembly 100, electronic components are electrically connected in parallel with the light emitting diode elements 12 in such a way that an electronic behavior of the component string 22 having the inorganic light emitting diode elements 12, 14, 16 is at least similar to the electronic behavior of a corresponding component string having organic light emitting diode elements.

In particular, a first capacitor 44 and a first ohmic resistance 42 are connected in parallel with the first light emitting diode element 12. A second capacitor 50 and a second ohmic resistance 48 are connected in parallel with the second light emitting diode element 14. In parallel with the third light emitting diode element 16, a third capacitor 56 and a third ohmic resistance 54 are electrically connected in series. The capacitors 44, 50, 58 correspond to the corresponding intrinsic capacitances, and the resistances 42, 48, 54 correspond to the intrinsic electrode resistances of the organic light emitting diode elements 12, 14, 16, 18 explained above.

When the component string 22 is supplied with electrical energy, the capacitors 44, 50, 56 are charged. After the energy supply of the component string 22 has been interrupted, the component string 22 discharges apart from the energy stored in the capacitors 44, 50, 56. When the second switch 104 is closed, the capacitors 44, 50, 56 discharge via the second switch 104, such that the maximum value of the discharge current can be detected by means of the current measuring device 105. If one of the light emitting diode elements 12, 14, 16 has a short circuit, then the corresponding capacitor 44, 50, 56 is not even charged in the first place or already discharges after the interrupting of the energy supply as a result of the opening of the first switch 101. The total voltage present after the opening of the first switch 101 is then reduced in turn by the capacitor voltage of the corresponding capacitor 44, 50, 56, as a result of which the maximum value of the discharge current decreases by the factor n−1/n. Consequently, the above-explained method for operating the optoelectronic assembly 100, in particular for determining the short circuit at one of the light emitting diode elements 12, 14, 16, 18, can readily be applied to the optoelectronic assembly 100 including the inorganic light emitting diode elements 12, 14, 16.

The capacitors 44, 50, 56 and the corresponding resistances 42, 48, 54 form in pairs respectively a parallel RC element and ensure that the resistance across which the capacitances discharge upon the closing of the second switch 104 rises linearly with the number n of LED modules, in particular of light emitting diode elements 12, 14, 16. As a result, the maximum value of the discharge current without a short circuit, as explained above, is again independent of the number of LED modules. The capacitors 44, 50, 56 have the effect that the threshold voltages are maintained for long enough, like the intrinsic capacitances of the organic light emitting diode elements. The capacitor 44, 50, 56 of a short-circuited LED module is rapidly discharged via the short circuit of the LED module and its threshold voltage is absent at the moment when the second switch 104 is closed. For the discharge of the total capacitance, however, the resistance 42, 48, 52 of the short-circuited LED module is still in the electrical circuit for the discharge current, as a result of which the total resistance of the component string remains the same, since the discharge current at the instant when the second switch 104 is closed is a high-frequency current for which the capacitors 44, 50, 56 present only small resistances. The capacitors 44, 50, 56 and the corresponding resistances 42, 48, 54 can be concomitantly mounted simply and cost-effectively on a printed circuit board (not illustrated) of the corresponding LED module.

If the resistance values of the resistances 42, 48, 54 are chosen to be small enough and the capacitances of the capacitors 44, 50, 56 are chosen to be large enough, then the capacitors 44, 50, 56 can also be used as additional smoothing capacitors (current ripple) and/or replace the output capacitor generally present in the driver circuit 20.

FIG. 9 shows diagrams with exemplary profiles of voltages and a current. In particular, the upper diagram in FIG. 9 shows a first voltage profile 120 and a second voltage profile 122. At the instant t=0, the component string 22 is supplied with energy and the voltage profiles 120, 122 rise to a first voltage value 124 and a second voltage value 126, respectively. The first voltage profile 120 corresponds to the voltage if a short circuit is present, and the second voltage profile 122 corresponds to the voltage if no short circuit is present. At a first instant 132, the supply of the component string 22 with energy is interrupted, such that the total voltage drops to the sum of the threshold voltages of the intact light emitting diode elements 12, 14, 16. In particular, the first voltage profile 120 drops to a third voltage value 128 and the second voltage profile 122 drops to a fourth voltage value 130.

The lower diagram in FIG. 9 shows the current profile of the discharge current, which in principle is zero apart from at the second instant 134, at which it briefly reaches the maximum value 136 of the discharge current. Given exclusively intact, that is to say entirely satisfactory light emitting diode elements 12, 14, 16, 18, the detected maximum value 136 is independent of the number n of light emitting diode elements 12, 14, 16, 18 in the component string 22 and/or one of the sections 102, 110.

FIG. 10 shows an exemplary table of measured values. The first column of the table indicates the number n of light emitting diode elements 12, 14, 16, 18 in the section 102, 110 to be checked. The second column indicates the maximum value I_MAX of the discharge current if no short circuit is present in the corresponding section 102, 110. The third column indicates the total voltage Utot across the corresponding section 102, 110 if no short circuit is present. The fourth column indicates the average individual voltage Utot/n at the light emitting diode elements 12, 14, 16, 18. The fifth column indicates the maximum value I_MAX of the discharge current if in each case one of the light emitting diode elements 12, 14, 16, 18 has a short circuit. The sixth column indicates the total voltage Utot across the corresponding section 102, 110 if one of the light emitting diode elements 12, 14, 16, 18 has the short circuit. The seventh column indicates the average individual voltage Utot/(n−1) across each of the light emitting diode elements 12, 14, 16, 18 if one of the light emitting diode elements 12, 14, 16, 18 has the short circuit. The eighth column indicates percentage deviations VGL of the empirically determined maximum values I_MAX of the discharge current given the presence of a short circuit relative to the corresponding empirically determined maximum values I_MAX of the discharge current given exclusively entirely satisfactory light emitting diode elements 12, 14, 16, 18. The ninth column indicates the corresponding theoretically calculated expected values EW. The tenth column indicates the differences DEL between the empirically determined deviations VGL and the corresponding theoretically determined expected values EW.

It is evident from FIGS. 9 and 10 that the short circuit can be identified simply and reliably by means of the above-explained method for operating the assembly 100 and/or by means of the assemblies 100 illustrated above.

The diagrams and the table confirm the functioning of the methods described above. The total forward voltages represented by the voltage profiles 120, 122 during the operation of the optoelectronic assembly 100 can vary greatly depending on the type, size and/or resistance value of the short circuit. The maximum value 136 of the discharge current is independent of the number n of light emitting diode elements 12, 14, 16, 18 in principle, taking account of acceptable tolerances. The maximum value 136 in the case of a short-circuited light emitting diode element 12, 14, 16, 18 decreases to (n−1)/n times the maximum value 136 without a short circuit.

FIG. 11 shows a circuit diagram of one exemplary embodiment of an optoelectronic assembly 100, which can be embodied for example in a manner largely corresponding to the optoelectronic assembly 100 shown in FIG. 6. The first section 102 includes at least the first light emitting diode element 12. The second section 110 includes at least the first and second light emitting diode elements 12, 14. A third section 140 includes at least the first, second and third light emitting diode elements 12, 14, 16. The first input 106 and the second input 116 correspond to one another. The first output 108 is arranged between the first and second light emitting diode elements 12, 14. The second output 118 is arranged between the second and third light emitting diode elements 14, 16. A third input of the third section 140 corresponds to the first and second inputs 106, 116. An output of the third section 140 is arranged between the third and fourth light emitting diode elements 16, 18. A fourth section includes all the light emitting diode elements 12, 14, 16, 18 of the component string 22. An input of the fourth section corresponds to the first and second inputs 106, 116.

The third switch 112 is electrically coupled firstly to the second output 118 and secondly to a second current measuring device 141. The third switch 112 in its first switching state bridges the third and fourth light emitting diode elements 16, 18. A fourth switch 144 is electrically coupled firstly to the first output 108 and secondly to a third current measuring device 142. The fourth switch 144 in its first switching state bridges the second, third and fourth light emitting diode elements 14, 16, 18. A fifth switch 146 is electrically coupled firstly to the third output of the third section 140 and secondly to a fourth current measuring device 143. The fifth switch 146 in its first switching state bridges the fourth light emitting diode element 18.

Consequently, with the fourth switch 144 closed, only the first section 102 can be supplied with electrical energy.

Moreover, with the fourth switch 144 open and the second switch 112 closed, the second section 110 can be supplied with electrical energy. Moreover, with the fourth switch 144 open, the second switch 112 open and the fifth switch 146 closed, the third section 140 can be supplied with electrical energy. If the second, fourth and fifth switches 112, 144, 146 are open and are thus in each case in their second switching state, then the entire component string 22 can be supplied with energy.

When one of the sections 102, 110, 140 or the entire component string 22 is supplied with electrical energy, the intrinsic capacitances of the corresponding light emitting diode elements 12, 14, 16, 18 are charged. After the energy supply has been interrupted, the intrinsic capacitances discharge, provided that no short circuit is present, only to the threshold voltages of the corresponding individual light emitting diode elements 12, 14, 16, 18, such that the corresponding total voltage Utot consisting of the sum of the individual threshold voltages of the intact light emitting diode elements 12, 14, 16, 18 is established across the corresponding section 102, 110, 140. When the first input 106 is electrically coupled to the first output 108 via the second switch 104 and the fourth switch 144, a short discharge current flows via the electrical coupling on account of said threshold voltage. In the case of an intact first light emitting diode element 12, the maximum value of the discharge current corresponds to the quotient of the threshold voltage and the electrode resistance of the first light emitting diode element 12, lead resistances and contact resistances being disregarded. The electrode resistance of the first light emitting diode element 12 can be predefined as a setpoint value for the maximum value in the case of an intact light emitting diode element 12 if the first section 102 includes only the first light emitting diode element 12. If the short circuit is present at the first light emitting diode element 12, then the first light emitting diode element 12 already discharges before the electrical coupling of the first input 106 to the first output 108 via the short circuit and, upon the electrical coupling of the first input 106 to the first output 108, discharge current no longer flows or, if the intrinsic capacitance has not yet been entirely discharged, only a very small discharge current flows, via the second and fourth switches 104, 144.

In order to check the first light emitting diode element 12 with regard to the short circuit, therefore, firstly the first switch 101 is switched into its first switching state, that is to say is closed, and the second, third, fourth and fifth switches 104, 112, 144, 146 are switched into their second switching states, that is to say are opened. The component string 22 is supplied with electrical energy by means of the driver circuit 20. Next, the driver circuit 20 is switched off and/or the first switch 101 is opened, such that the supply of the component string 22 with electrical energy is interrupted. After the predefined time duration, the second switch 104 and the third, fourth or fifth switch 104, 112, 144, 146 are closed, such that a direct electrical coupling between one of the inputs 106, 116 of the sections 102, 110, 140 and the corresponding output 108, 118 is produced. At the same time, the discharge current which flows upon the electrical coupling is detected by means of the corresponding current measuring device 105, 142, 141, 143. In particular, the maximum value of the discharge current is detected. The examination with regard to the short circuit can be carried out in a manner substantially corresponding to the examinations explained above.

Alternatively, in order to detect the short circuit of individual sections of the component string 22, the second switch 104 can remain open. By way of example, a section can then be defined such that it includes only the fourth light emitting diode element 18 and the corresponding section, in particular the fourth light emitting diode element 18, can then be examined with regard to the short circuit by the input of the corresponding section being electrically coupled to the output of the corresponding section via the fifth switch 146 and the fourth current measuring device 143. The maximum value of the discharge current via the corresponding section can then be detected by means of the fourth current measuring device 143. Alternatively or additionally, a section can then be defined such that it includes only the third and fourth light emitting diode elements 16, 18 and the corresponding section, in particular the third and fourth light emitting diode elements 16, 18, can then be examined with regard to the short circuit by the input of the corresponding section being electrically coupled to the output of the corresponding section via the third switch 112 and the second current measuring device 141. The maximum value of the discharge current via the corresponding section can then be detected by means of the second current measuring device 141. Alternatively or additionally, a section can then be defined such that it includes only the second, third and fourth light emitting diode elements 14, 16, 18 and the corresponding section, in particular the second, third and fourth light emitting diode elements 14, 16, 18, can then be examined with regard to the short circuit by the input of the corresponding section being electrically coupled to the output of the corresponding section via the fourth switch 144 and the third current measuring device 142. The maximum value of the discharge current via the corresponding section can then be detected by means of the third current measuring device 142. Corresponding sections are explained below with reference to FIG. 12.

Alternatively or additionally, the detected maximum values can be compared with one another taking account of the different numbers of light emitting diode elements 12, 14, 16, 18 in the sections 102, 110, 140, as a result of which a relative and/or redundant checking of the presence of a short circuit is possible. In principle, when detecting the maximum value, the signature of the short circuit is all the more pronounced, the shorter the examined component string 22 or section 102, 110, 140.

In the exemplary embodiment shown in FIG. 11, there is only ever one light emitting diode element 12, 14, 16, 18 arranged between two terminals of the switches 112, 144, 146. As an alternative thereto, however, it is also possible for two or more light emitting diode elements 12, 14, 16, 18 to be arranged between two terminals of the switches 112, 144, 146. Furthermore, the fourth switch 144 or the fifth switch 146 can be dispensed with or even further switches can be arranged such that they define new sections and are in each case directly connected to ground.

FIG. 12 shows a circuit diagram of one exemplary embodiment of an optoelectronic assembly 100, which can be embodied for example in a manner largely corresponding to the optoelectronic assembly 100 shown in FIG. 11.

In this exemplary embodiment, the first section 102 is defined such that it includes only the fourth light emitting diode element 18. The second section 110 is defined such that it includes the third and fourth light emitting diode elements 16, 18. The third section 140 is defined such that it includes the second, third and fourth light emitting diode elements 18. The first current measuring device 105 is connected between the output of the component string 22 and the switches 112, 144, 146 and also the driver circuit 20.

In order to check the entire component string 22 with regard to the short circuit, the second switch 104 can be closed and the third, fourth and fifth switches 112, 144, 146 can remain open. The first section 102, in particular the fourth light emitting diode element 18, can be examined with regard to the short circuit by the input of the first section 102 being electrically coupled to the output of the corresponding section via the fifth switch 146 and the first current measuring device 105. The maximum value of the discharge current via the first section 102 can then be detected by means of the first current measuring device 105. Alternatively or additionally, the second section 110, in particular the third and fourth light emitting diode elements 16, 18, can be examined with regard to the short circuit by the input of the second section 110 being electrically coupled to the output of the second section 110 via the third switch 112 and the first current measuring device 105. The maximum value of the discharge current via the second section 110 can then be detected by means of the first current measuring device 105. Alternatively or additionally, the third section 140, in particular the second, third and fourth light emitting diode elements 14, 16, 18 can be examined with regard to the short circuit by the input of the third section 140 being electrically coupled to the output of the third section 140 via the fourth switch 144 and the first current measuring device 105. The maximum value of the discharge current via the third section 140 can then be detected by means of the first current measuring device 105.

In the case of the optoelectronic assembly 100 shown in FIG. 12, each of the switches 112, 144, 146 can be a transistor, for example a MOSFET, which is directly connected to ground. As a result, a simple and cost-effective driving of the corresponding switch 112, 144, 146 is possible, since the control signal for the corresponding MOSFET can be related to ground. Furthermore, only the current measuring device 105, in particular the first current measuring device 105, is necessary in order to be able to detect each individual one of the maximum values. The current measuring device 105, too, can be related directly to ground. This enables a cost-effective embodiment of the optoelectronic assembly 100 and/or a particularly precise detection of the maximum values. Moreover, the first current measuring device 105 can be used for regulating the optoelectronic assembly 100 during the normal operation of the optoelectronic assembly 100.

The present disclosure is not restricted to the exemplary embodiments indicated. By way of example, the component strings 22 shown can in each case include more or fewer light emitting diode elements 12, 14, 16, 18 and/or more or fewer sections 102, 110, 140 and correspondingly more or fewer switches 104, 112, 144, 146. Furthermore, the optoelectronic assembly 100 may include one, two or more further component strings 22. Furthermore, the exemplary embodiments can be combined with one another. By way of example, in all the exemplary embodiments, inorganic light emitting diode elements 12, 14, 16, 18 can be used, for example with the corresponding capacitors 44, 50, 56 and resistances 42, 48, 54.

Furthermore, in the case of the embodiments and/or exemplary embodiments in accordance with FIGS. 4 to 11, it holds true, in principle, that an input of the component string 22 can correspond to an input of the first section 102 and/or a first electrode of the first light emitting diode element 12 and that an output of the component string 22 can correspond to an output of the last section, for example to the output of the second section 110, and/or a second electrode of the last light emitting diode element of the component string 22, for example of the fourth light emitting diode element 18.

Furthermore, in the case of the embodiment and/or the exemplary embodiment in accordance with FIG. 12, it holds true, in principle, that an output of the component string 22 can correspond to an output of the first section 102 and/or a second electrode of the first light emitting diode element 12 and that an input of the component string 22 can correspond to an input of the longest section and/or a first electrode of the first light emitting diode element 12 of the component string 22.

Furthermore, in principle, a second electrode of one of the light emitting diode elements 12, 14, 16 can correspond to the first electrode of the succeeding light emitting diode element 14, 16, 18. If the component string 22 includes a plurality of sections 102, 110, then in principle an output of one section 102 can correspond to a second electrode of the last light emitting diode element 12, 14 in the corresponding section 102 and/or to an input of the succeeding section 110 and/or to a first electrode of the first light emitting diode element 16, 18 in the succeeding section 110.

If only one section 102 is implemented, then this can correspond to the component string 22 and/or be designated as the component string 22. If a section 102 and/or a component string 22 include(s) only one light emitting diode element 12, then the light emitting diode element 12 in principle is representative of the section 102 and/or the component string 22.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for operating an optoelectronic assembly, comprising at least one component string having at least one section, wherein the section comprises at least one light emitting diode element, the method comprising:
supplying the section with electrical energy,
interrupting the supply of the section with electrical energy,
electrically coupling an input of the section to an output of the section, wherein the section is short-circuited via the electrical coupling of the input to the output,
detecting a maximum value of an electrical discharge current which flows via the section,
wherein the maximum value of the discharge current is the quotient of the sum of the threshold voltages of light emitting diode elements which are intact and the sum of an electrode resistance of all the light emitting diode elements, and
determining whether the section of the component string has a short circuit depending on the detected maximum value.

2. The method as claimed in claim 1, wherein it is identified that the section has the short circuit if the detected maximum value is equal or at least approximately equal to zero, and wherein it is identified that the section has no short circuit if the detected maximum value is not equal to zero.

3. The method as claimed in claim 1, wherein the detected maximum value is compared with a predefined setpoint value that is greater than zero,
- it is identified that the section of the component string has a short circuit if the detected maximum value is less than the predefined setpoint value,
- it is identified that the section of the component string has no short circuit if the detected maximum value is equal or at least approximately equal to or greater than the predefined setpoint value.

4. The method as claimed in claim 1, wherein the input of the section and the output of the section are electrically coupled only after a predefined time duration after the interrupting of the supplying of the section with electrical energy.

5. The method as claimed in claim 4, further comprising determining after what time duration after the interrupting of the supplying of the section with energy a voltage across the section of the component string corresponds to a sum of the threshold voltages of all the light emitting diode elements of the section, and wherein the determined time duration is predefined as the predefined time duration.

6. The method as claimed in claim 1, wherein the supply of the section with energy is interrupted by a driver circuit for operating the component string being switched off or an electrical connection between the driver circuit and the component string being interrupted.

7. The method as claimed in claim 1, wherein
- firstly it is determined whether a first section of the component string that comprises a first light emitting diode element has a short circuit by virtue of the fact that an input of the first section of the component string is electrically coupled to an output of the first section of the component string and a first maximum value of the electrical discharge current which flows via the first section is detected,
- if it is identified that the first section has no short circuit, the detected first maximum value is predefined as a setpoint value,
- the electrical coupling between the input and the output of the first section is interrupted,
- the first section of the component string and a second section of the component string, said second section being connected in series with the first section and comprising at least one second light emitting diode element, are supplied with energy,
- the supply of the first section and of the second section with energy is interrupted,
- an input of the first section and an output of the second section are electrically coupled to one another,
- a second maximum value of an electrical discharge current which flows via the electrical coupling of the input of the first section to the output of the second section is detected,
- the detected second maximum value is compared with the predefined setpoint value,
- it is identified that the second section has a short circuit if the detected second maximum value is less than the predefined setpoint value,
- it is identified that the second section has no short circuit if the detected second maximum value is equal or at least approximately equal to or greater than the predefined setpoint value.

8. The method as claimed in claim 1, wherein
- firstly it is determined whether a first section of the component string that comprises a first light emitting diode element has a short circuit by virtue of the fact that an input of the first section of the component string is electrically coupled to an output of the first section of the component string, a first maximum value of the electrical discharge current which flows via the electrical coupling of the first section is detected, and the first maximum value is compared with a predefined first setpoint value,
- the electrical coupling between the input and the output of the first section is interrupted,
- a second section of the component string, said second section being connected in series with the first section and comprising at least one second light emitting diode element, is supplied with energy,
- the supply of the second section with energy is interrupted,
- an input of the second section and an output of the second section are electrically coupled to one another,
- a second maximum value of an electrical discharge current which flows via the electrical coupling of the second section is detected,
- the detected second maximum value is compared with a predefined second setpoint value,
- it is identified that the second section has a short circuit if the detected second maximum value is less than the predefined second setpoint value,
- it is identified that the second section has no short circuit if the detected second maximum value is equal or at least approximately equal to or greater than the predefined second setpoint value.

9. The method as claimed in claim 1, further comprising:
- predetermining a setpoint value such that it corresponds to a quotient of a threshold voltage and an electrode resistance of one of the light emitting diode elements that the section comprises, and
- determining the short circuit in one of the sections using the setpoint value.

10. An optoelectronic assembly, comprising:
- at least one component string having at least one section, wherein the section comprises at least one light emitting diode element,
- a driver circuit electrically coupled to the component string and serving for supplying the component string with electrical energy,
- a first switch for interrupting the supply of the component string with energy,
- a second switch for electrically coupling an input of the section of the component string to an output of the section of the component string, wherein the section is short-circuited via the electrical coupling of the input to the output by means of the second switch,
- a current measuring unit for detecting a maximum value of an electrical discharge current which flows via the electrical coupling of the section,
- wherein the maximum value of the discharge current is the quotient of the sum of the threshold voltages of light emitting diode elements which are intact and the sum of an electrode resistance of all the light emitting diode elements,
- an evaluation unit, which is configured to determine, depending on the detected maximum value, whether the section of the component string has a short circuit.

11. The optoelectronic assembly as claimed in claim 10, wherein the first switch is designed such that the driver circuit can be switched on or switched off by means of the first switch or that an electrical connection between the driver circuit and the component string can be connected or interrupted.

12. The optoelectronic assembly as claimed in claim 10, wherein
the component string comprises a first section and a second section, which is electrically connected in series with the first section,
the first section comprises at least one first light emitting diode element,
the second section comprises at least one second light emitting diode element,
the optoelectronic assembly comprises a third switch, which in its first switching state electrically couples an output of the first section to an output of the second section and which in its second switching state electrically isolates the output of the first section and the output of the second section from one another and which is electrically coupled to the second switch.

13. The optoelectronic assembly as claimed in claim 12, further comprising a fourth switch, which in its first switching state electrically couples an input of the first section to an input of the second section and which in its second switching state electrically isolates the input of the first section and the input of the second section from one another and which is electrically coupled to the third switch.

14. The optoelectronic assembly as claimed in claim 10, wherein at least one of the light emitting diode elements is an inorganic light emitting diode and wherein in parallel with the inorganic light emitting diode a capacitor and an electrical resistance are electrically connected in series.

15. The optoelectronic assembly as claimed in claim 10, wherein at least one section of the component string comprises at least two light emitting diode elements.

16. The method as claimed in claim 1, wherein the maximum value of the discharge current is independent of the number of light emitting diode elements.

* * * * *